(12) United States Patent
Alvarez-Cohen et al.

(10) Patent No.: US 12,050,951 B2
(45) Date of Patent: *Jul. 30, 2024

(54) METHOD AND DEVICE FOR SHARING SOCIAL MEDIA PROFILE

(71) Applicant: POPL CO, Los Angeles, CA (US)

(72) Inventors: Jason Dean Alvarez-Cohen, Los Angeles, CA (US); Nicholas Sullivan Eischens, Los Angeles, CA (US); Jeremy William Greenfield, Oklahoma City, OK (US)

(73) Assignee: POPL CO, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,888

(22) Filed: Sep. 27, 2022

(65) Prior Publication Data

US 2023/0018653 A1 Jan. 19, 2023

Related U.S. Application Data

(63) Continuation of application No. 17/150,697, filed on Jan. 15, 2021, now Pat. No. 11,487,982, which is a continuation of application No. 16/863,688, filed on Apr. 30, 2020, now Pat. No. 10,949,725.

(60) Provisional application No. 62/958,196, filed on Jan. 7, 2020, provisional application No. 62/910,226, filed on Oct. 3, 2019.

(51) Int. Cl.
| | |
|---|---|
| *G06K 19/07* | (2006.01) |
| *G06F 9/54* | (2006.01) |
| *G06F 16/955* | (2019.01) |
| *G06Q 50/00* | (2012.01) |
| *H04W 4/80* | (2018.01) |

(52) U.S. Cl.
CPC ......... *G06K 19/0723* (2013.01); *G06F 9/547* (2013.01); *G06F 16/9558* (2019.01); *G06Q 50/01* (2013.01); *H04W 4/80* (2018.02)

(58) Field of Classification Search
CPC . G06K 19/0723; H04W 4/80; G06F 16/9558; G06Q 50/01
USPC ........................................................ 340/10.1
See application file for complete search history.

(56) References Cited

U.S. PATENT DOCUMENTS

| | | |
|---|---|---|
| 9,408,238 B2 | 8/2016 | Nambord et al. |
| 10,949,725 B1 | 3/2021 | Alvarez-Cohen et al. |
| 11,487,982 B2 * | 11/2022 | Alvarez-Cohen ....... H04W 4/80 |

(Continued)

FOREIGN PATENT DOCUMENTS

WO 2015090393 A1 6/2015

OTHER PUBLICATIONS

U.S. Appl. No. 16/863,688, "Corrected Notice of Allowability", Feb. 10, 2021, 2 pages.

(Continued)

*Primary Examiner* — Ahshik Kim
(74) *Attorney, Agent, or Firm* — FisherBroyles, LLP

(57) ABSTRACT

Accessories for an electronic device and methods are described. The accessory comprises a substrate configured to be removably attached to the electronic device and a near-field communications (NFC) tag attached to the substrate and configured to transmit interaction data in response to receiving a signal from a separate electronic device. The interaction data causes the separate electronic device to access user data associated with a unique user account.

20 Claims, 18 Drawing Sheets

(56) References Cited

U.S. PATENT DOCUMENTS

| | | |
|---|---|---|
| 2008/0303632 A1 | 12/2008 | Hammad |
| 2012/0315845 A1 | 12/2012 | Buczek |
| 2014/0138435 A1 | 5/2014 | Khalid |
| 2014/0208112 A1 | 7/2014 | McDonald et al. |
| 2015/0026296 A1 | 1/2015 | Halpern |
| 2015/0244421 A1 | 8/2015 | Nambord et al. |
| 2017/0068951 A1 | 3/2017 | Ball et al. |
| 2019/0245825 A1 | 8/2019 | Shah |
| 2019/0253515 A1 | 8/2019 | Guilaume et al. |
| 2019/0281030 A1 | 9/2019 | Isaacson et al. |
| 2022/0006892 A1 | 1/2022 | Perkins et al. |

OTHER PUBLICATIONS

U.S. Appl. No. 16/863,688, "First Action Interview Pilot Program Pre-Interview Communication", Dec. 3, 2020, 5 pages.

U.S. Appl. No. 16/863,688, "Notice of Allowance", Jan. 15, 2021, 15 pages.

U.S. Appl. No. 17/150,697, "Non-Final Office Action", Jan. 25, 2022, 10 pages.

PCT/US2020/053508, "International Search Report and Written Opinion", Jan. 18, 2021, 9 pages.

\* cited by examiner

METHOD AND DEVICE FOR SHARING SOCIAL MEDIA PROFILE

CROSS-REFERENCES TO OTHER APPLICATIONS

This application is a continuation of U.S. patent application Ser. No. 17/150,697, filed on Jan. 15, 2021, which is a continuation of U.S. patent application Ser. No. 16/863,688, filed on Apr. 30, 2020, which claims priority to U.S. provisional patent application Ser. No. 62/910,226 filed on Oct. 3, 2019 and U.S. provisional patent application No. 62/958,196 filed on Jan. 7, 2020, all of which are hereby incorporated by reference in their entirety for all purposes.

BACKGROUND

Social media provides convenient ways for people to connect, for personal and professional relationships. However, it can be unwieldly and time consuming to share a particular social media profile during an in-person interaction, particularly if someone would like to share multiple social media profiles. They may need to verbally communicate the social media profile information and require the other person to search for the profile or attempt to remember the information. Additionally, businesses cards or other objects with the social media profile information can be lost or forgotten. Some methods of facilitating the sharing of social media profiles may rely on both parties having the same mobile electronic device, operating system, or accounts on the same social media service, limiting the effectiveness of these methods. There is a need to make sharing a social media profiles more efficient and for such a system to be easily reconfigurable so that a user can change the social media profiles they choose to share based on different social situations (e.g., professional events, social events).

Embodiments address these and other issues, individually and collectively.

BRIEF SUMMARY

One embodiment of the present disclosure may include an accessory for an electronic device, the accessory comprising a substrate configured to be removably attached to the electronic device and a near-field communications (NFC) tag attached to the substrate and configured to transmit interaction data in response to receiving a signal from a separate electronic device, wherein the interaction data causes the separate electronic device to access user data associated with a unique user account.

Another embodiment of the present disclosure may include a method comprising receiving, by an NFC tag, interaction data from a first electronic device, wherein the NFC tag is integrated within an accessory and storing, by the NFC tag, the interaction data. The method also includes receiving, by the NFC tag, a signal from a second electronic device proximate to the NFC tag and transmitting, by the NFC tag, the interaction data to the second electronic device causing the second electronic device to access data associated with a unique user account on a social media service.

Further details regarding embodiments of the invention can be found in the Detailed Description and the Figures.

DETAILED DESCRIPTION

In order to better appreciate the features and aspects of the present disclosure, further context for the disclosure is provided in the following section by discussing one particular implementation of a method and apparatus for transmitting unique user data to an electronic device, according to embodiments of the disclosure. These embodiments are for explanatory purposes only and other embodiments may be employed in other electronic devices. For example, embodiments of the disclosure can be used with any device that receives or transmits audio, video or data signals. In some instances, embodiments of the disclosure are particularly well suited for use with portable electronic media devices because of their portability and inherent near-field communications (NFC) capabilities.

For example, in some embodiments a method and an apparatus for a first user of a first electronic device to selectively transmit unique user data to a second user of a second electronic device via a preprogrammed NFC tag is disclosed. The NFC tag can be preprogrammed with a unique link and/or unique user data that is associated with the first user. The second user can be directed to the first user's information, such as one or more social media accounts, by placing the second electronic device proximate the NFC tag. In response the second user's electronic device automatically receives the unique link and/or unique user data from the NFC tag, providing the second user a convenient and automatic way to be directed to the first user's unique information.

In another example, a first user programs an NFC tag with a link that is configured to direct any electronic device that follows the link to the first user's unique user profile on a hosting site (e.g., Popl®). The first user attaches the NFC tag to their electronic device and configures their unique user profile on the hosting site to direct all electronic devices that follow the link to the first user's unique social media profile (e.g., LinkedIn®). When the first user wishes to transmit their unique social media profile (e.g., LinkedIn® profile) to an acquaintance, the first user allows the acquaintance to place their electronic device proximate the NFC tag. The acquaintance's electronic device downloads the link from the NFC tag and is directed by the hosting site (e.g., Popl®) to access the first user's unique social media profile (e.g., LinkedIn® profile) via the social media database (e.g., LinkedIn® database) and asks the acquaintance if they want to connect to the first user's unique social media profile (e.g., LinkedIn® profile).

Figure 1:
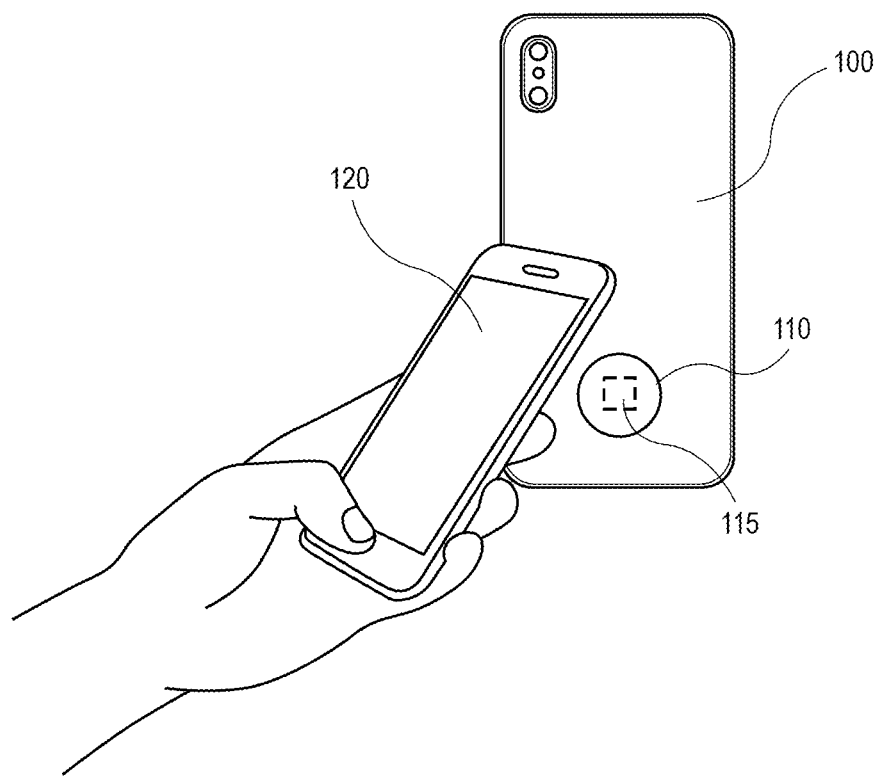
FIG. 1 shows a high level diagram of an NFC tag according to embodiments of the disclosure.

FIG. 1 depicts an illustrative rendering of first mobile device 100, such as a smart phone, that includes an accessory 110 attached to a back surface. In some embodiments accessory 110 can include a communications device 115 that can be a NFC device, an RF identification device (RFID), a Bluetooth Low Energy (BLE) device, or any other device that employs RF communications to transmit and receive data. In various embodiments accessory 110 may include a substrate that is configured to be removably attached to the first mobile device while in other embodiments the accessory can be a phone case, a removable second user. One of skill in the art with the benefit of this disclosure would appreciate other types and configurations of links that could be programed within the NFC tag or other communications device. Additional details about programming the NFC tag with interaction data are provided below with reference to FIG. 4.

Figure 2A:
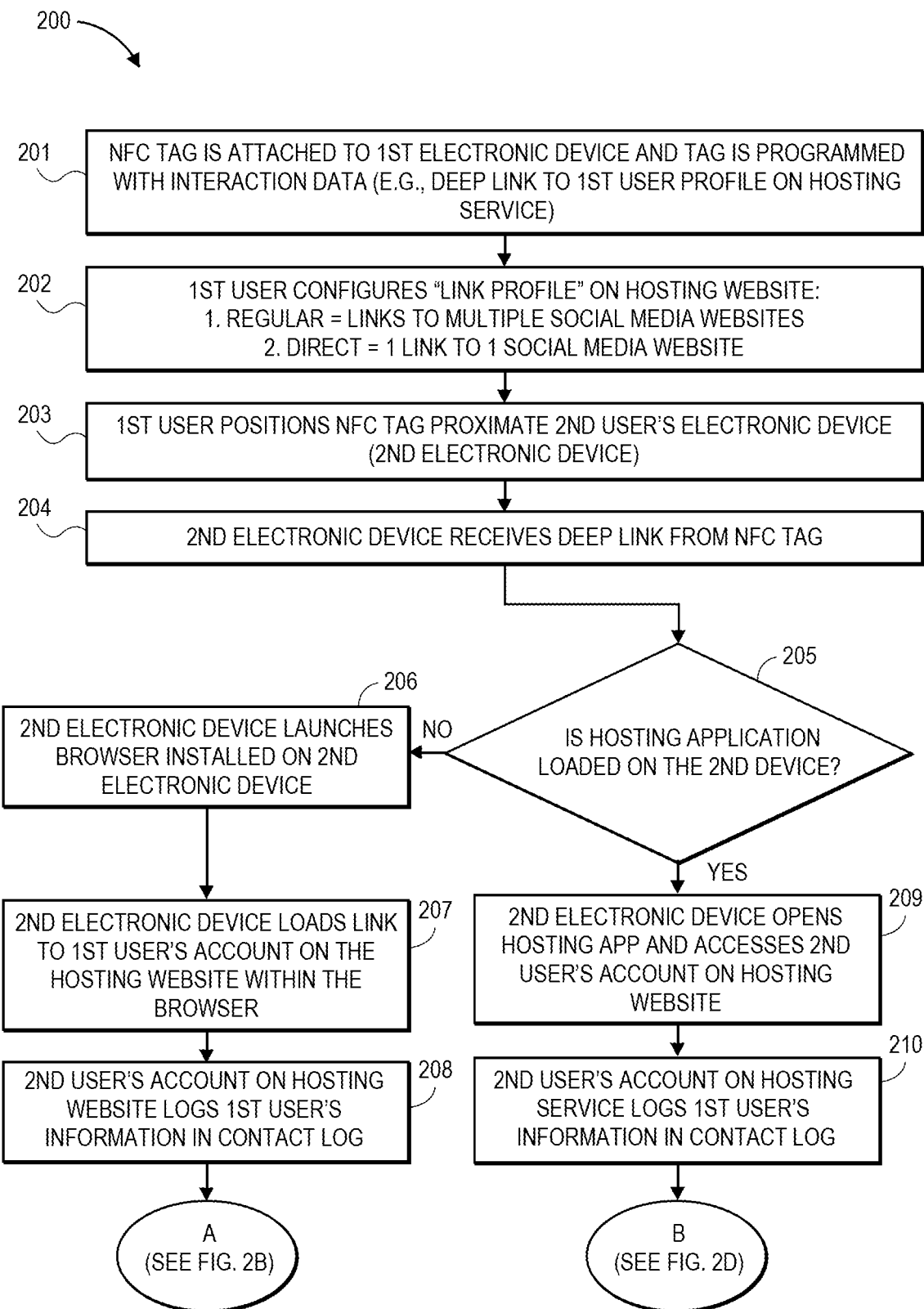
FIG. 2A-E show a flow diagram of reading interaction data from a URL in an NFC tag according to embodiments of the disclosure.

As shown in FIG. 2A, step 202, the first user can configure a link profile within the first user's account on the hosting website (e.g. Popl® website). In some embodiments, the link profile can be configured in one of two ways to redirect any electronic device (e.g., a second electronic device of a second user) that has been directed to the first user's account via the interaction data to one or more social media profiles of the first user.

In a first embodiment, the link profile can be configured as a "Regular" profile such that the second electronic device that follows the interaction data will be directed to a regular profile of the first user that includes a plurality of selectable links to social media services for which the first user has accounts. The second user can then be presented with options for which social media services of the first user they would like to be connected to. For example, the regular profile can include a link to the first user's professional social media account (e.g., LinkedIn®), the first user's general social media account (e.g., Facebook®) and the first user's posting account (e.g., Twitter®). The second user can select any of the first user's social media services they would like to be connected to and upon selecting a particular social media service they will be connected to the first user within the selected social media service, as described in more detail herein.

Alternatively, the first user can configure the link profile as a "Direct" profile. In this configuration, any second electronic device that follows the interaction data will be directed to a direct profile of the first user that presents the second user only one social media service option to link to the first user. For example, the first user may be at a work function and may set the link profile to direct such that all second users are presented only with an option to connect via first user's professional social media account (e.g., LinkedIn®). The second user can approve the connection and will be connected to the first user within the selected social media service, as described in more detail herein.

In some embodiments the first user may be able to reconfigure the link profile by toggling between Regular and Direct and changing the social media service that the direct link redirects to and/or changing the plurality of social media services that the regular link redirects to. One of skill in the art with the benefit of this disclosure will appreciate the other ways in which a user's link profile can be changed.

As shown in FIG. 2A, step 203, the first user can position the NFC tag proximate a second electronic device associated with a second user. The second electronic device may be, for example, a smartphone.

As shown in FIG. 2A, step 204, the second electronic device can receive the interaction data, such as the deep link from the NFC tag. In one embodiment, the second electronic device can read the interaction data from the NFC tag by transmitting an electromagnetic signal that conforms to near field communication standards. The NFC tag, acting as a passive transponder, may then receive the signal from the second electronic device and transmit back a modulated signal that includes encoded interaction data. The second electronic device can then receive the signal transmitted by the NFC tag, decode the interaction data and identify the deep link.

As shown in FIG. 2A, step 205, the second electronic device determines if an application program associated with the hosting service (e.g., Popl®) is installed on the second electronic device. In one embodiment the second electronic device determines that an application program associated with the hosting service is not installed on the second electronic device and proceeds to step 206. In another embodiment the second electronic device determines that an application program associated with the hosting service is installed on the second electronic device and proceeds to step 209. In some embodiments the interaction data (e.g., mobile deep link) identifies the hosting service in a way that the second electronic device can determine if an application program associated with the hosting service is resident on the second electronic device.

As shown in FIG. 2A, step 206, if the hosting application is not installed on the second electronic device, the second electronic device can launch a browser installed on the second electronic device.

As shown in FIG. 2A, step 207, the second electronic device loads a link to the first user's account on the hosting website (e.g., Popl®) within the browser. The link to the first user's account can be derived from the interaction data (e.g., mobile deep link). If the second user has an account with the hosting service, the second electronic device can access the second user's account before displaying the data associated with the link to the first user's account (e.g., the second user may appear as logged in to the hosting website). If the second user does not have an account on the hosting website, the hosting website may be accessed, for example, as a guest, and the second user can be presented with the first user's regular or direct profile.

As shown in FIG. 2A, in step 208, the second user's account on the hosting service (e.g., Popl®) can log the first user's information in a contact log. For example, the first user's name, profile image, and other contact information can be stored in a database of the hosting service. This may allow the second user to access information about the first user at a later time. In some embodiments, the first user's information may only be stored in the contact log if the second user has an account with the hosting service. In other embodiments, the first user's information may be saved even if the second user does not have an account with the hosting service or is not logged in. For example, the first user's information may be stored in a local cache on the second user device. In some embodiments, the first user's account on the hosting service may also log information about the second user. When the hosting service accesses the first user's account, the hosting service may store information about the second user in a contact log for the first user. This can allow the first user to connect with the second user at a later time. The method can then proceed to block A, depicted in FIG. 2B.

As shown in FIG. 2A, step 209, if the second electronic device does have the hosting application program installed, the second electronic device can launch the hosting application program and access the second user's account. For example, the second user can appear as logged in to their hosting service account.

As shown in FIG. 2A, step 210, the second user's hosting service account can log the first user's information in a contact log. For example, the first user's name, profile image, and other contact information can be stored. This may allow the second user to access information about the first user at a later time. In some embodiments, the first user's account on the hosting service may also log information about the second user. When the hosting service accesses the first user's account, the hosting service may store information about the second user in a contact log for the first user. This can allow the first user to connect with the second user at a later time. The method can then proceed to block B, depicted in FIG. 2C.

Figure 2B:
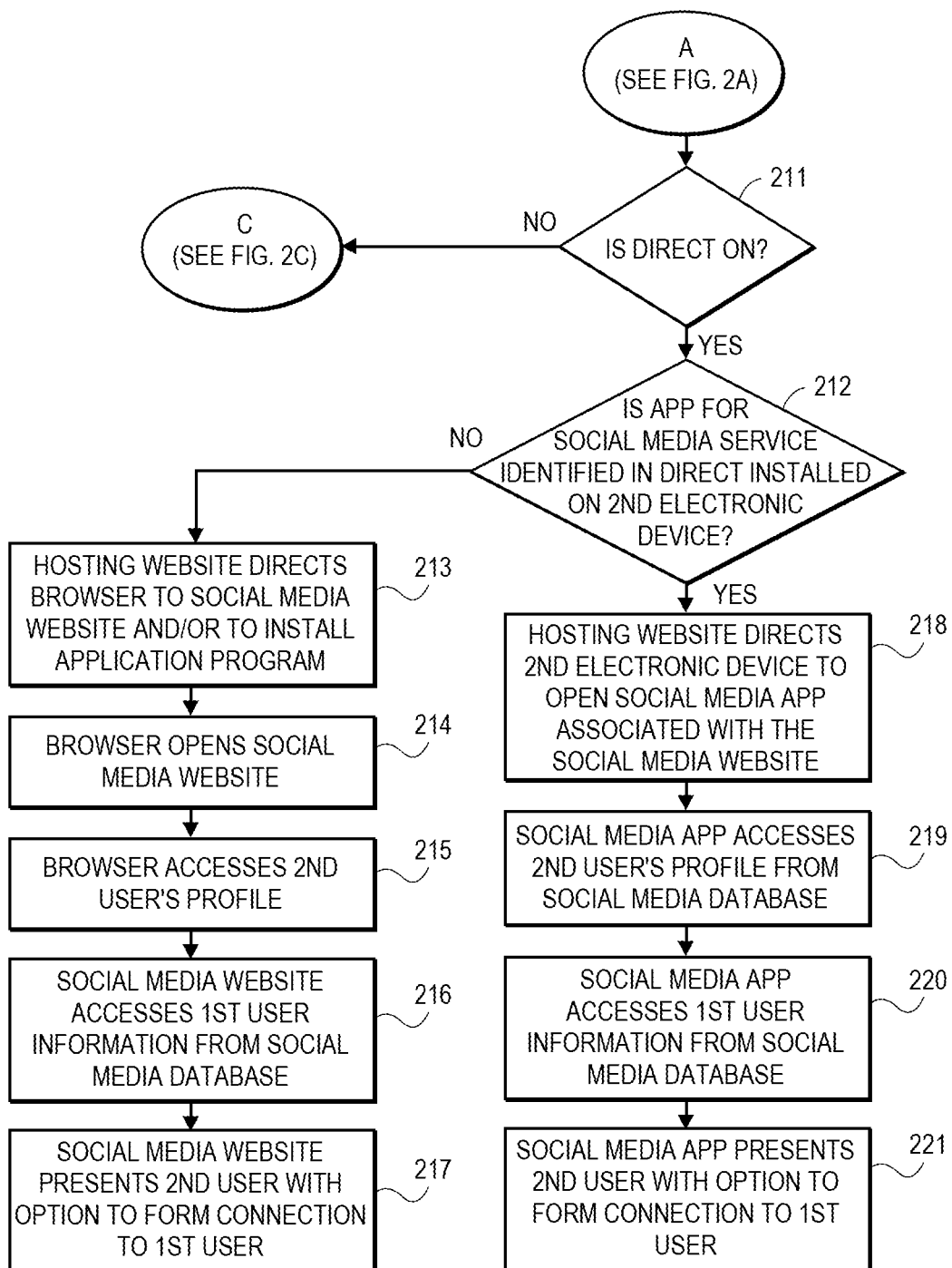

In FIG. 2B, the method can continue from block A in which the second electronic device opened the hosting website via a browser.

As shown in FIG. 2B, step 211, method 200 follows different paths depending upon whether the first user configured the link profile as "Direct" or "Regular" in step 202. If the first user configured their link profile with "Regular" the second user will be presented with multiple options to connect to the first user via a plurality of social media services and if the second user selects at least one of the social media services the process will proceed to block C in FIG. 2C. If the first user configured their link profile with "Direct" the second user will be presented with an option to connect to the first user via a single social media service and if the second user accepts the process will proceed to step 212.

As shown in FIG. 2B, step 212, the second user has agreed to connect to the first user via the direct social media service. In response the second electronic device can detect if an application program associated with the social media service is installed on the second electronic device. If the second electronic device detects that the application program is not installed, the second electronic device can proceed to step 213. If the second electronic device detects that application program is installed, the second electronic device can proceed to step 218.

As shown in FIG. 2B, step 213, if the application program associated with the Direct social service is not installed on the second electronic device, the second electronic device can open a website associated with the social media service and/or the second electronic device can prompt the second user to download and install an application program associated with the social media service (e.g., the second electronic device can go to an application marketplace (e.g., the Apple App Store®, the Google Play™ Store) to download the application). If the website opens and the user proceeds the process proceeds to step 214. However if the user agrees to download the application program associated with the social media service, after the application is installed the method can proceed to step 218 and open the application program as if it had already been downloaded. In further embodiments the newly installed application program can present the second user with an option to connect with the first user.

As shown in FIG. 2B, 214, the second user proceeds to access the Direct social media service via the browser on the second electronic device. The browser proceeds to open a website associated with the social media service.

As shown in FIG. 2B, 215, the browser can access the second user's profile on the social media website, assuming the second user has a profile set up with the social media service. This may be, for example, to display the second user as logged in. The browser may attempt to retrieve data associated with the second user from a database of the social media service (e.g, load the second user's profile). If the second user does not have a profile on the social media website, the browser may open the social media website as a guest.

As shown in FIG. 2B, 216, the browser of the second electronic device can then access user data associated with the first user's unique user account (e.g., a profile on the social media service) from a database of the social media service. In some embodiments, information for retrieving the first user data can be passed to the second electronic device from the hosting service.

As shown in FIG. 2B, in step 217, in some embodiments, the social media website can present the second user with an option to perform an action, such as forming a connection with the first user. For example, the second user may be presented with an option to follow the first user or add the first user as a connection. For example, the Instagram® website may now display an Instagram® profile of the first user within the second user's account and ask the second user if they want to follow the first user. This process may employ one or more deep links and/or an API token. In some embodiments, the process may employ an access token (e.g., an OAuth 2 access token) encoding information about the unique user account. In some embodiments, the API token may enable the action without requiring input from the second user. In some embodiments, the API token may perform an action on behalf of the social media profile of the first user. For example, the API token may cause the Instagram® account of the first user to follow the Instagram® account of the second user. In embodiments, this action may be taken without requiring input from the first user and/or the second user.

Now referring back to step 212 if the application program for the social media service is installed on the second electronic device, the process proceeds to step 218 FIG. 2B. In step 218 the second electronic device determines that an application program associated with the social media service selected in the first user's Direct link profile is installed on the second electronic device. The second electronic device responds by opening the application program.

As shown in FIG. 2B, in step 219, the social media application program can access the second user's profile. This may be, for example, to display the second user as logged in. The social media application may retrieve data associated with the second user from a database of the social media service. If the second user does not have a profile on the social media website, the browser may open the social media application program as a guest.

As shown in FIG. 2B, in step 220, the social media application program can access unique user data about the first user from a database of the social media service via the application program. information for retrieving the first user data can be passed to the second electronic device from the hosting service. The first user's profile can then be presented to the second user on the second electronic device.

As shown in FIG. 2B, in step 221, the social media application can present the second user with an option to perform an action, such as forming a connection with the first user. For example, the second user may be presented with an option to follow the first user or add the first user as a connection. For example, the Instagram® website may now display an Instagram® profile of the first user within the second user's account and ask the second user if they want to follow the first user. This process may employ one or more deep links and/or an API token. In some embodiments, the process may employ an access token (e.g., an OAuth 2 access token) encoding information about the unique user account. In some embodiments, the API token may enable the action without requiring input from the second user. In some embodiments, the API token may perform an action on behalf of the social media profile of the first user. For example, the API token may cause the Instagram® account of the first user to follow the Instagram® account of the second user. In embodiments, the API token may enable this action without requiring input from the first user and/or the second user.

Now referring back to block C in FIG. 2B, the hosting service application is not installed on the second electronic device and the first user's link profile is not set to Direct, thus the first user's link profile is set to Regular and the hosting service is accessed via the hosting service website.

Figure 2C:
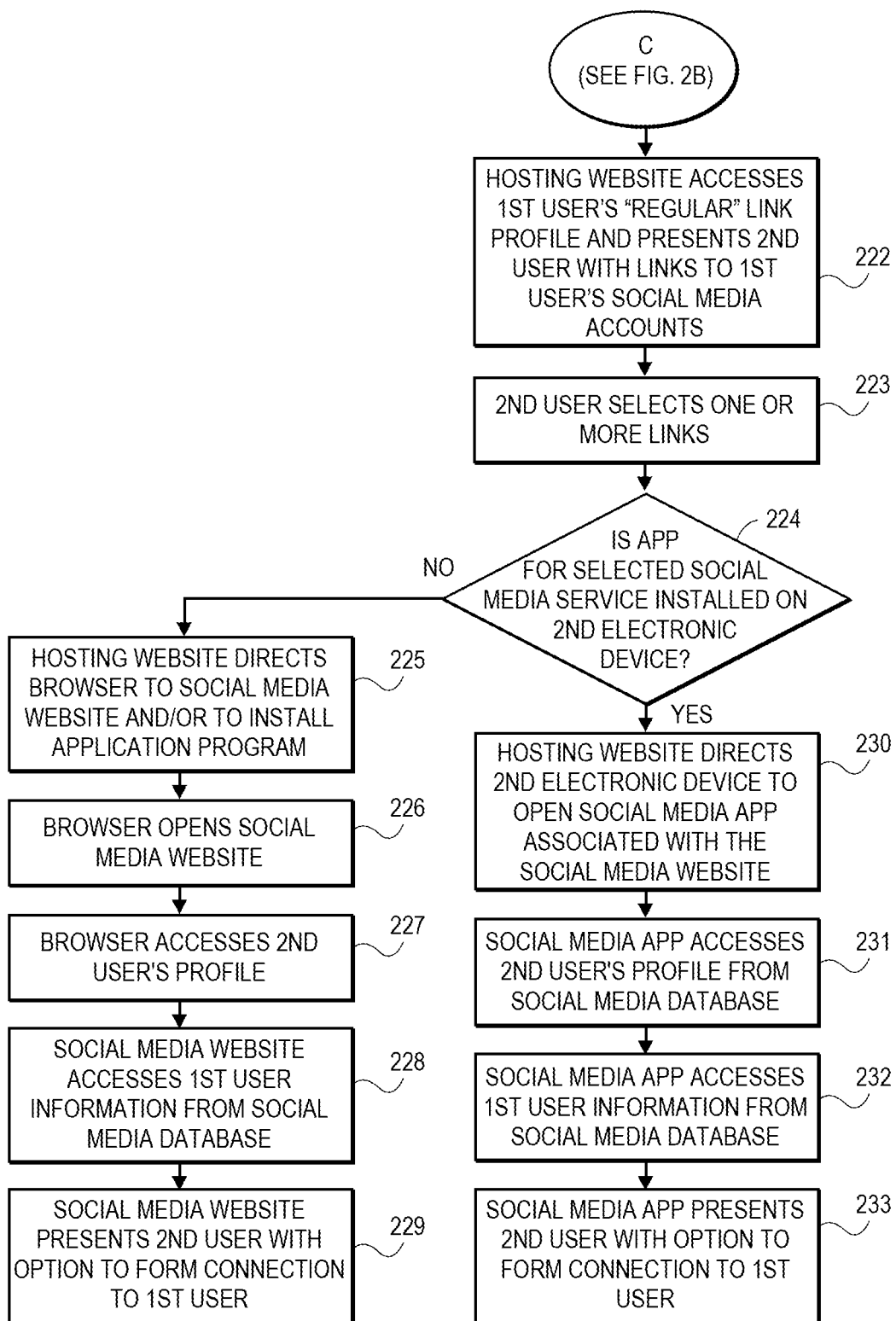

As shown in FIG. 2C, in step 222, the browser of the second electronic device can access the first user's account on the hosting service website. The hosting website can access information about the first user from a database associated with the hosting service. The Regular profile of the first user can include links to a plurality of social media accounts of the first user. For example, the profile may include icons of social media services for which the first user has accounts. The profile may also include, for example, a photo of the first user, their name, contact information, etc. In some embodiments, some or all of the links may be mobile deep links. In some embodiments, the links may also include a "mailto" link, an "sms" link, or an API token.

As shown in FIG. 2C, in step 223, the second user can then select one or more of the links. For example, the second user can tap or click on one or more of the icons. The hosting website can then redirect the second user device to social media services associated with the selected links. For example, if the second user selects one link the hosting website can direct the second user to that link, however if the second user selects more than one link the hosting website can direct the second user to each social media service they selected.

As shown in FIG. 2C, in step 224, the second electronic device can detect if an application program associated with the selected social media service is installed on the second electronic device. If the second electronic device detects that the application program is not installed, the second electronic device can go to step 225. If the second electronic device detects that the application program is installed, the second electronic device can go to step 230.

As shown in FIG. 2C, step 225, if the application program associated with the Regular social media service is not installed on the second electronic device, the second electronic device can open a website associated with the social media service and/or the second electronic device can prompt the second user to download and install an application program associated with the social media service (e.g., the second electronic device can go to an application marketplace (e.g., the Apple App Store®, the Google Play™ Store) to download the application). If the website opens and the user proceeds the process proceeds to step 226. However if the user agrees to download the application program associated with the social media service, after the application is installed the method can proceed to step 230 and open the application program as if it had already been downloaded. In further embodiments the newly installed application program can present the second user with an option to connect with the first user.

As shown in FIG. 2C, step 226, the second user proceeds to access the Regular social media service via the browser on the second electronic device. The browser proceeds to open a website associated with the social media service.

As shown in FIG. 2C, step 227, the browser can access the second user's profile on the social media website, assuming the second user has a profile set up with the social media service. This may be, for example, to display the second user as logged in. The browser may attempt to retrieve data associated with the second user from a database of the social media service (e.g., load the second user's profile). If the second user does not have a profile on the social media website, the browser may open the social media website as a guest.

As shown in FIG. 2C, step 228, the browser of the second electronic device can then access user data associated with the first user's unique user account (e.g., a profile on the social media service) from a database of the social media service. In some embodiments, information for retrieving the first user data can be passed to the second electronic device from the hosting service.

As shown in FIG. 2C, in step 229, in some embodiments, the social media website can present the second user with an option to perform an action, such as forming a connection with the first user. For example, the second user may be presented with an option to follow the first user or add the first user as a connection. For example, the Instagram® website may now display an Instagram® profile of the first user within the second user's account and ask the second user if they want to follow the first user. This process may employ one or more deep links and/or an API token. In some embodiments, the process may employ an access token (e.g., an OAuth 2 access token) encoding information about the unique user account. In some embodiments, the API token may enable the action without requiring input from the second user. In some embodiments, the API token may perform an action on behalf of the social media profile of the first user. For example, the API token may cause the Instagram® account of the first user to follow the Instagram® account of the second user. In embodiments, the API token may enable this action without requiring input from the first user and/or the second user. In some embodiments if the second user has selected more than one of the social media service links the process steps from 224 to 229 and/or 224 to 233 can be repeated for each selected link.

Now referring back to step 224, if the application program for the social media service is installed on the second electronic device, the process proceeds to step 230 FIG. 2C. In step 230 the second electronic device determines that an application program associated with the social media service selected in the first user's Regular link profile is installed on the second electronic device. The second electronic device responds by opening the application program.

As shown in FIG. 2C, in step 231, the social media application program can access the second user's profile. This may be, for example, to display the second user as logged in. The social media application may retrieve data associated with the second user from a database of the social media service. If the second user does not have a profile on the social media website, the browser may open the social media application program as a guest.

As shown in FIG. 2C, in step 232, the social media application program can access unique user data about the first user from a database of the social media service via the application program. information for retrieving the first user data can be passed to the second electronic device from the hosting service. The first user's profile can then be presented to the second user on the second electronic device.

As shown in FIG. 2C, in step 233, the social media application can present the second user with an option to perform an action, such as forming a connection with the first user. For example, the second user may be presented with an option to follow the first user or add the first user as a connection. For example, the Instagram® website may now display an Instagram® profile of the first user within the second user's account and ask the second user if they want to follow the first user. This process may employ one or more deep links and/or an API token. In some embodiments, the process may employ an access token (e.g., an OAuth 2 access token) encoding information about the unique user account. In some embodiments, the API token may enable the action without requiring input from the second user. In some embodiments, the API token may perform an action on behalf of the social media profile of the first user. For example, the API token may cause the Instagram® account of the first user to follow the Instagram® account of the second user. In embodiments, the API token may enable this action without requiring input from the first user and/or the second user.

Now referring back to FIG. 2A, after step 210 the method can continue from block B in which the hosting application program (e.g., PopI®) is loaded on the second electronic device and the application program has accessed the second user's account (e.g., loaded the second user's PopI® account). Now referring to FIG. 2D, step 234 method 200 follows different paths depending upon whether the first user configured the link profile as "Direct" or "Regular" in step 202. If the first user configured their link profile with "Regular" the second user will be presented within the hosting service application program with multiple options to connect to the first user via a plurality of social media services and if the second user selects at least one of the social media services the process will proceed to block D in FIG. 2E. If the first user configured their link profile with "Direct" on the method can proceed to step 235.

Figure 2D:
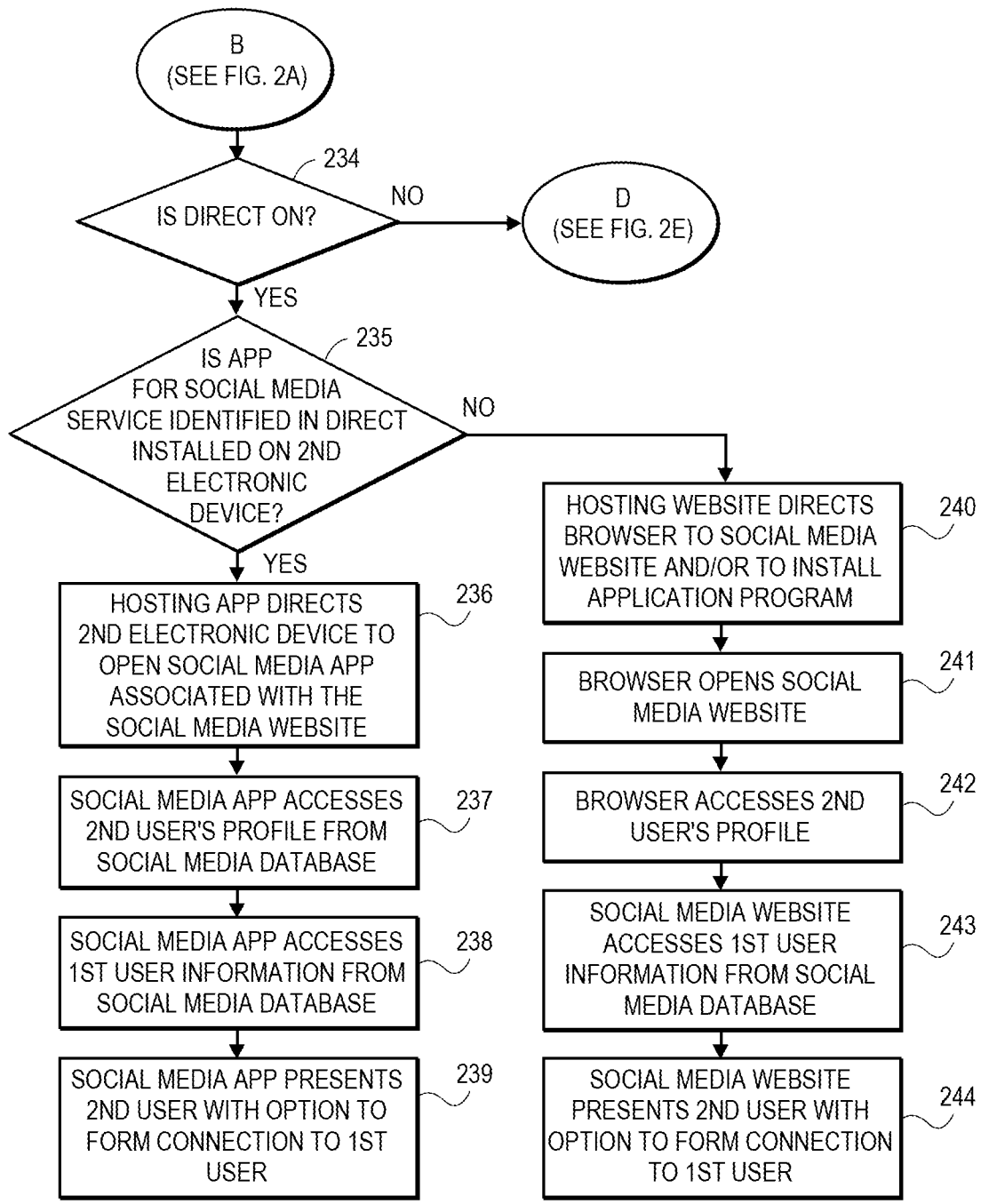

As shown in FIG. 2D, step 235, the second electronic determines if an application program associated with the social media service identified in the first user's Direct link profile is installed on the second electronic device. If the second electronic device detects that the application program is not installed, the second electronic device can proceed to step 240. If the second electronic device detects that application program is installed, the second electronic device can proceed to step 236.

As shown in FIG. 2D, step 236 the second electronic device determines that an application program associated with the social media service selected in the first user's Direct link profile is installed on the second electronic device. The second electronic device responds by opening the application program.

As shown in FIG. 2D, in step 237, the social media application program can access the second user's profile. This may be, for example, to display the second user as logged in. The social media application may retrieve data associated with the second user from a database of the social media service. If the second user does not have a profile on the social media website, the browser may open the social media application program as a guest.

As shown in FIG. 2D, in step 238, the social media application program can access unique user data about the first user from a database of the social media service via the application program. information for retrieving the first user data can be passed to the second electronic device from the hosting service. The first user's profile can then be presented to the second user on the second electronic device.

As shown in FIG. 2D, in step 239, the social media application can present the second user with an option to perform an action, such as forming a connection with the first user. For example, the second user may be presented with an option to follow the first user or add the first user as a connection. For example, the Instagram® website may now display an Instagram® profile of the first user within the second user's account and ask the second user if they want to follow the first user. This process may employ one or more deep links and/or an API token. In some embodiments, the process may employ an access token (e.g., an OAuth 2 access token) encoding information about the unique user account. In some embodiments, the API token may enable the action without requiring input from the second user.

More specifically, in one embodiment, if the second electronic device has both the application program for the hosting service and the application program for the Direct social media service both installed, as soon as the interaction data is received by the second electronic device (see step 204) the second electronic device can automatically be directed to the Direct social media application program and present the second user with an option to connect to the first user.

Now referring back to step 235 if the application program for the social media service is not installed on the second electronic device, the process proceeds to step 240 FIG. 2D.

As shown in FIG. 2D, step 240, if the application program associated with the Direct social service is not installed on the second electronic device, the hosting application directs the second electronic device to open a website associated with the social media service and/or the second electronic device can prompt the second user to download and install an application program associated with the social media service (e.g., the second electronic device can go to an application marketplace (e.g., the Apple App Store®, the Google Play™ Store) to download the application). If the website opens and the user proceeds the process proceeds to step 241. However if the user agrees to download the application program associated with the social media service, after the application is installed the method can proceed to step 236 and open the application program as if it had already been downloaded. In further embodiments the newly installed application program can present the second user with an option to connect with the first user.

As shown in FIG. 2D, step 241, the second user proceeds to access the Direct social media service via the browser on the second electronic device. The browser proceeds to open a website associated with the social media service.

As shown in FIG. 2D, step 242, the browser can access the second user's profile on the social media website, assuming the second user has a profile set up with the social media service. This may be, for example, to display the second user as logged in. The browser may attempt to retrieve data associated with the second user from a database of the social media service (e.g, load the second user's profile). If the second user does not have a profile on the social media website, the browser may open the social media website as a guest.

As shown in FIG. 2D, 243, the browser of the second electronic device can then access user data associated with the first user's unique user account (e.g., a profile on the social media service) from a database of the social media service. In some embodiments, information for retrieving the first user data can be passed to the second electronic device from the hosting service and/or the hosting application program.

As shown in FIG. 2D, in step 244, in some embodiments, the social media website can present the second user with an option to perform an action, such as forming a connection with the first user. For example, the second user may be presented with an option to follow the first user or add the first user as a connection. For example, the Instagram® website may now display an Instagram® profile of the first user within the second user's account and ask the second user if they want to follow the first user. This process may employ one or more deep links and/or an API token. In some embodiments, the process may employ an access token (e.g., an OAuth 2 access token) encoding information about the unique user account. In some embodiments, the API token may enable the action without requiring input from the second user. In some embodiments, the API token may perform an action on behalf of the social media profile of the first user. For example, the API token may cause the Instagram® account of the first user to follow the Instagram® account of the second user. In embodiments, the API token may enable this action without requiring input from the first user and/or the second user.

Now referring back to block D in FIG. 2E, the hosting service application is installed on the second electronic device and the first user's link profile is not set to Direct, thus the first user's link profile is set to Regular and the hosting service is accessed via the hosting service application program.

Figure 2E:
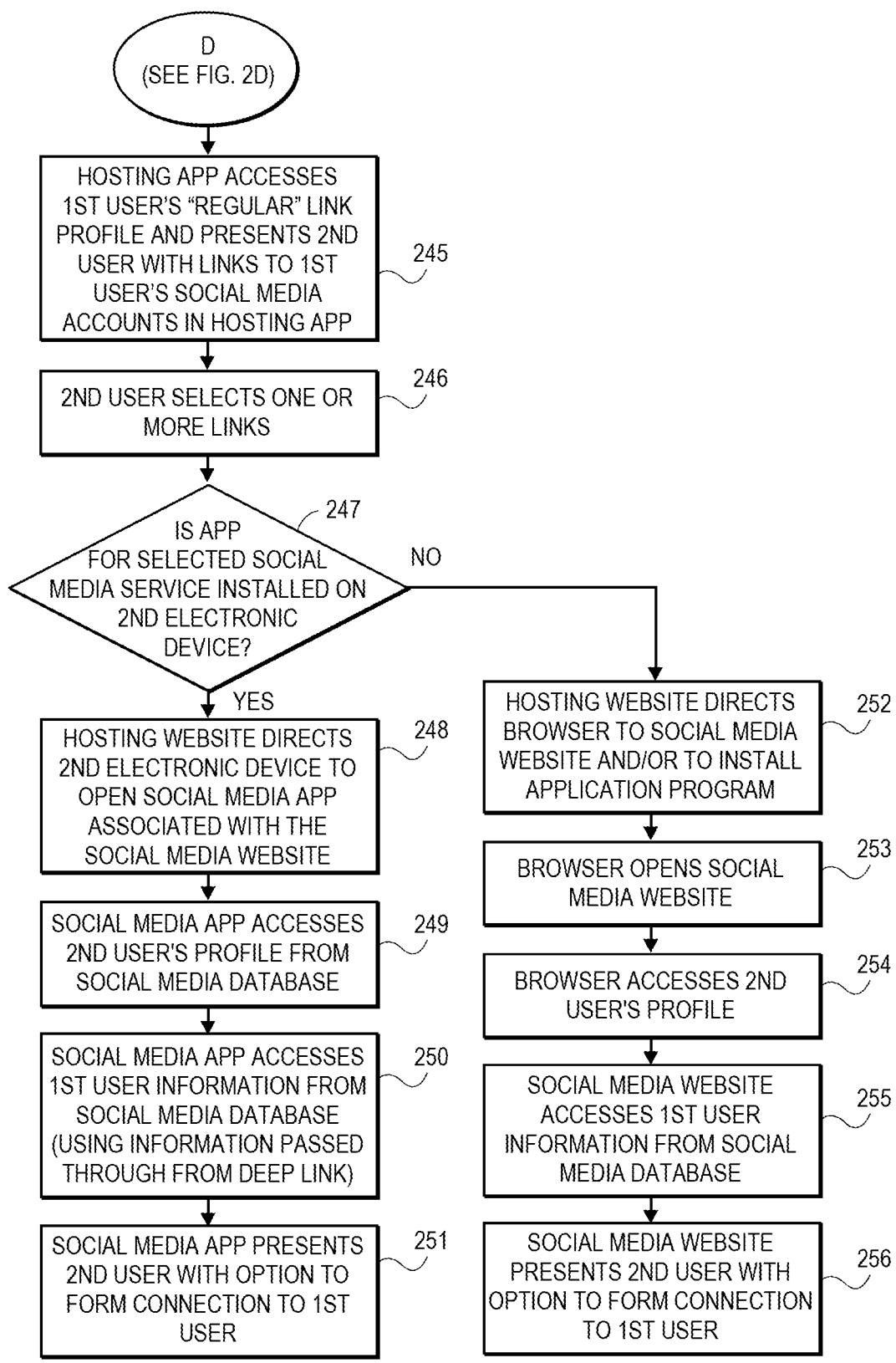

As shown in FIG. 2E, in step 245, the hosting application loaded on the second electronic device can access the first user's account. The hosting application can access information about the first user from a database associated with the hosting service. The profile of the first user can include links to a plurality of social media accounts of the first user selected in the first user's Regular link profile. For example, the profile may include icons of social media websites where the first user has accounts. The profile may also include, for example, a photo of the first user, their name, contact information, etc. In some embodiments, some or all of the links may be mobile deep links. In some embodiments, the links may also include a "mailto" link, an "sms" link, or an API token.

As shown in FIG. 2E, in step 246, the second user can then select one or more of the social media accounts. For example, the second user can tap or click on one of the icons. The hosting website can then redirect the second user device to the selected link. In some embodiments this process can be performed sequentially in which after the second user selects a particular link the second user is taken through a process to form a connection and once that process is completed the second user can be directed back to the application program to determine if they wish to connect via another social media service.

As shown in FIG. 2E, in step 247 the second electronic device can initiate detecting if an application program associated with the social media service is installed on the second electronic device. If the second electronic device detects that the application program is not installed, the second electronic device can go to step 252. If the second electronic device detects that application program is installed, the second electronic device can go to step 248.

As shown in FIG. 2D, in step 248 the second electronic device determines that an application program associated with the social media service selected in the first user's Regular link profile is installed on the second electronic device. The second electronic device responds by opening the application program.

As shown in FIG. 2D, in step 249, the social media application program can access the second user's profile. This may be, for example, to display the second user as logged in. The social media application may retrieve data associated with the second user from a database of the social media service. If the second user does not have a profile on the social media website, the social media application program may open to a guest account.

As shown in FIG. 2D, in step 250, the social media application program can access unique user data about the first user from a database of the social media service via the application program. Information for retrieving the first user data can be passed to the second electronic device from the hosting service. The first user's profile can then be presented to the second user on the second electronic device.

As shown in FIG. 2D, in step 251, the social media application can present the second user with an option to perform an action, such as forming a connection with the first user. For example, the second user may be presented with an option to follow the first user or add the first user as a connection. For example, the Instagram® website may now display an Instagram® profile of the first user within the second user's account and ask the second user if they want to follow the first user. This process may employ one or more deep links and/or an API token. In some embodiments, the process may employ an access token (e.g., an OAuth 2 access token) encoding information about the unique user account. In some embodiments, the API token may enable the action without requiring input from the second user.

Now referring back to step 247 if the application program for the social media service is not installed on the second electronic device, the process proceeds to step 252 FIG. 2E.

As shown in FIG. 2E, step 252, if the application program associated with the Regular social media service is not installed on the second electronic device, the second electronic device can open a website associated with the social media service and/or the second electronic device can prompt the second user to download and install an application program associated with the social media service (e.g., the second electronic device can go to an application marketplace (e.g., the Apple App Store®, the Google Play™ Store) to download the application). If the website opens and the user proceeds the process proceeds to step 253. However if the user agrees to download the application program associated with the social media service, after the application is installed the method can proceed to step 248 and open the application program as if it had already been downloaded. In further embodiments the newly installed application program can present the second user with an option to connect with the first user.

As shown in FIG. 2E, step 253, the second user proceeds to access the Regular social media service via the browser on the second electronic device. The browser proceeds to open a website associated with the social media service.

As shown in FIG. 2E, step 254, the browser can access the second user's profile on the social media website, assuming the second user has a profile set up with the social media service. This may be, for example, to display the second user as logged in. The browser may attempt to retrieve data associated with the second user from a database of the social media service (e.g., load the second user's profile). If the second user does not have a profile on the social media website, the browser may open the social media website as a guest.

As shown in FIG. 2E, step 255, the browser of the second electronic device can then access user data associated with the first user's unique user account (e.g., a profile on the social media service) from a database of the social media service. In some embodiments, information for retrieving the first user data can be passed to the second electronic device from the hosting service.

As shown in FIG. 2E, in step 256, in some embodiments, the social media website can present the second user with an option to perform an action, such as forming a connection with the first user. For example, the second user may be presented with an option to follow the first user or add the first user as a connection. For example, the Instagram® website may now display an Instagram® profile of the first user within the second user's account and ask the second user if they want to follow the first user. This process may employ one or more deep links and/or an API token. In some embodiments, the process may employ an access token (e.g., an OAuth 2 access token) encoding information about the unique user account. In some embodiments, the API token may enable the action without requiring input from the second user. In some embodiments if the second user has selected more than one of the social media service links the process steps from 245 to 256 and/or 245 to 251 can be repeated for each selected link.

Figure 3:
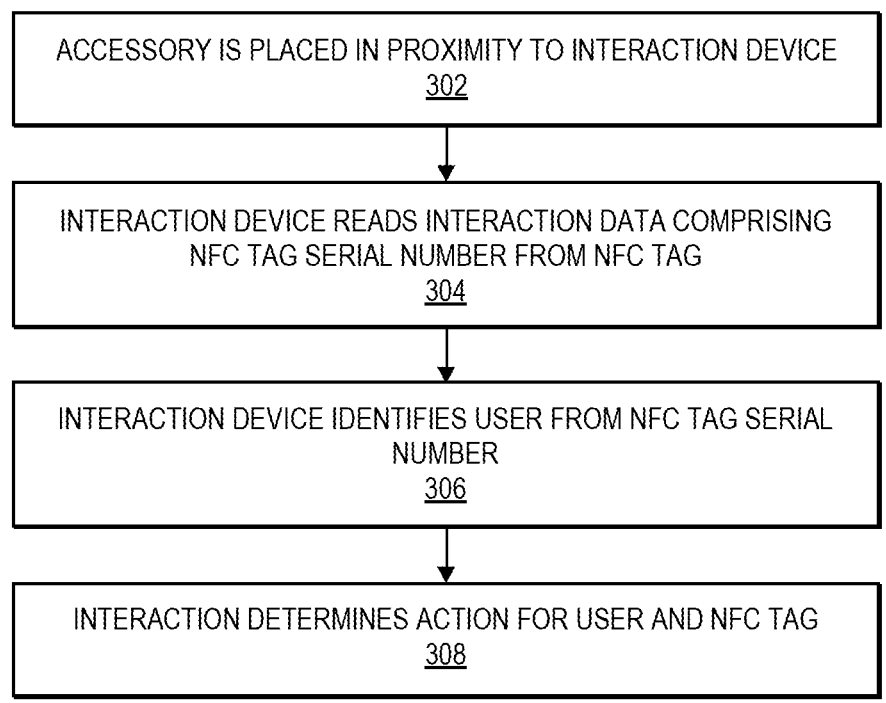
FIG. 3 shows a flow diagram of reading interaction data from a serial number of NFC tag according to embodiments of the disclosure.

FIG. 3 illustrates a method for using the accessory 110 of FIG. 1 to access a resource from a resource provider. More specifically, in some embodiments the communications device 115 (see FIG. 1) can share interaction data with a resource provider (e.g., an electronic door lock, an electronic garage door system, a home security system, an event venue, a gym access system) and provide access for the user of the electronic device. In some embodiments, the communications device can include an NFC tag that can transmit a serial number as a portion of the interaction data. A user may have previously registered the serial number with the resource provider, such that when the user positions the accessory proximate a sensor of the resource provider the serial number from the NFC tag is received by the resource provider. The serial number of the NFC tag may then be linked to an account of the user with the resource provider. For example, an event venue may associated the serial number with a concert ticket of the user in a database of the event venue.

As shown in FIG. 3, step 302, the accessory can be placed in proximity to an interaction device. For example, the accessory may be attached to the back of a mobile device (e.g., a cell phone) and the second electronic device may be a turnstile at a concert venue. The user can then hold their mobile device such that the accessory is close to an access point on the turnstile.

As shown in FIG. 3, step 304, the NFC tag within the accessory can transmit interaction data, comprising the NFC tag serial number, to the interaction device. The interaction device may transmit an NFC signal from an NFC antenna. The NFC tag, acting as a passive transponder, may receive the NFC signal from the interaction device, then retransmit the NFC signal with the interaction data. In this way, the interaction device can read the serial number from the NFC tag. The interaction data transmitted by the NFC tag may also include a link. In some embodiments, the composition of the of the interaction data may depend on the NFC signal from the interaction device. For example, in response to one signal, the NFC tag may transmit the NFC tag serial number, while in response to a different signal, the NFC tag may transmit the link. In further embodiments the NFC tag may transmit both a link and a serial number in one responsive transmission.

As shown in FIG. 3, step 306, the interaction data can direct the interaction device to access user data associated with a unique user account based on the NFC tag serial number. In some embodiments, the second electronic device may use the serial number to query a database of users associated with the resource provider. For example, the second electronic device may be a turnstile at a music venue and the turnstile may query a database of ticketholders to identify a particular ticketholder associated with the serial number. As another example, the second electronic device may be an electronic lock on the first user's home and the electronic lock may query a database of valid codes that can be used to unlock the electronic lock. In some embodiments, the database may be stored in the interaction device. In other embodiments, the interaction device may communicate with a separate server computer in order to query the database.

As shown in FIG. 3, step 308, the interaction device can determine an action based on the identification of the user and the NFC tag. For example, the interaction device may allow access to a venue or open a door. In some embodiments, if the interaction device identified the user, the interaction device may indicate to the user that some action has taken place. For example, the interaction device may flash a green light, make a sound, display a message on a screen, or open a gate to indicate the positive identification. In some embodiments, the interaction device may indicate when it has not identified the user. For example, the interaction device can flash a red light, start a siren, or display a negative message on a screen. Additionally, or alternatively, the interaction device may indicate when it has identified a user that should not be granted access. For example, the interaction device may indicate that a user on a blacklist has attempted to use their NFC tag to gain access to a secure location.

Figure 4:
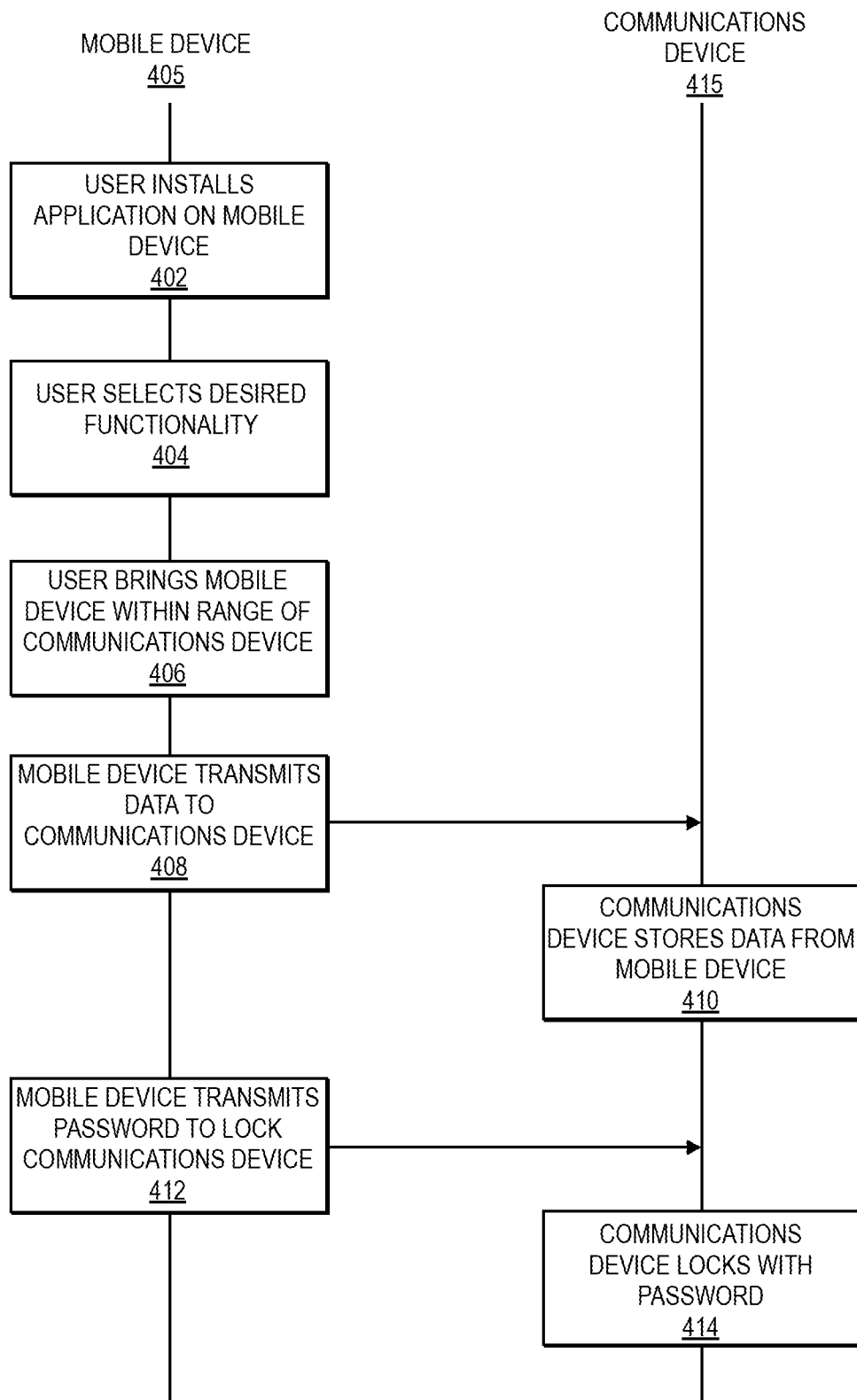
FIG. 4 shows a swim lane diagram of an NFC tag programming process according to embodiments of the disclosure.

FIG. 4 illustrates a process of initially programming an accessory, such as accessory 110 illustrated in FIG. 1. In some embodiments, when a user purchases an accessory that includes a communications device (e.g., communication device 115 in FIG. 1), there may be no interaction data programmed within the communications device. In other embodiments, the communications device may be programmed with a serial number during manufacturing, but not a link. In some embodiments, the accessory may be programmed with a password during manufacturing.

As shown in FIG. 4, step 402, a user of the mobile device 405 can install a hosting application on the mobile device 405. The hosting application may be a mobile application associated with the communications device 415. In some embodiments, the communications device 415 and/or packaging of the communications device 415 may have a link to access the hosting application (e.g., a URL to a website associated with the hosting application, a QR code that when scanned directs the mobile device 405 to download the hosting application). After downloading the hosting application, in some embodiments, the user may be prompted to create an account with the hosting application. The hosting application may then generate a profile for the user. The profile may comprise information such as a photo of the user, their name, and contact information. The user may also choose to link other social media profiles to their profile in the hosting application. For example, the user may link to their Instagram® account, their Facebook® account, and their LinkedIn® account. In some embodiments, linking to a social media account may comprise entering a public link to the social media profile into the hosting application. Additionally, or alternatively, linking to a social media application may comprise logging in to the social media website (e.g., using a Facebook® API to log into and link a Facebook® profile).

As shown in FIG. 4, step 404, the user can select the desired functionality in the hosting application. In some embodiments, the user may select that they wish to program the communications device 415 to direct other users to their profile in the hosting application. Such a link may be referred to as a regular link. In other embodiments, the user may select that they wish to program the communications device 415 to direct other users to a unique user account (e.g., an Instagram® account of the first user). Such a link may be referred to as a direct link. In yet other embodiments, the user may select that they wish to direct other users to a particular social media profile and perform a particular action with that social media profile (e.g., directing users to a LinkedIn® profile and providing an option to automatically connect to the LinkedIn® profile). In this embodiment, the user may have connected to the social media profile by logging in as part of an OAuth 2 protocol. An access token can then be issued to the hosting application for the user account. After selecting the desired action (e.g., sending a connection request), an API token may be generated for that action. Based on the functionality selected by the user, the hosting application may generate a link to a website associated with the hosting application that encodes the desired functionality. Any method can be used for this including, but not limited to, a "mobile deep link" (e.g., a link that directs a user to a specific location within an application program), a "deferred deep link" (e.g., a link that directs a user to a specific location within an application program, however if the application program is not installed it will direct users to a download location for the application program), any type of uniform resource identifier (URI) scheme, an application programming interface (API) token, any type of uniform resource locator (URL) scheme, or other link.

As shown in FIG. 4, step 406, the user can place the mobile device 405 proximate to the communications device 415 such that the communications device 415 is within the transmission range of the NFC antenna on the mobile device 405. During the programming process, the communications device may be separated from the mobile device so that the communications device can be placed proximate to the NFC antenna. For example, the communications device may not yet be attached to the mobile device or may be attached to an accessory that is not attached to the mobile device. In some embodiments, the communications device may be within range of the NFC antenna of the mobile device while still being attached to the mobile device. For example, a shielding element on the mobile device may be removed so that the communications device is within the transmission range of the NFC antenna.

As shown in FIG. 4, step 408, the mobile device 405 can transmit the interaction data to the communications device. The interaction data can comprise a link to the profile of the user on the hosting application. In some embodiments, the link may be a mobile deep link. In transmitting the data, the mobile device 405 may transmit a signal that encodes the link. The energy in the signal may power circuitry in the communications device 415 allowing it to receive the signal.

As shown in FIG. 4, step 410, the communications device 415 can store the interaction data received from the mobile device. In particular, the communications device 415 can store the link to the profile of the user on the hosting application. In embodiments, the link saved by the communications device 415 may be the same regardless of the functionality selected by the user in step 404. Thus, when any subsequent mobile device or other electronic device with an NFC antenna is placed proximate the communications device 415, the communications device 415 can transmit the interaction data.

As shown in FIG. 4, step 412, the mobile device 405 can transmit a lock command comprising a password to the communications device 415 to lock it. In some embodiments, the password may be a bit string (e.g., a 32-bit string). The communications device 415 can then store the password. In some embodiments, the password may be stored in an password section of the memory of the communications device 415 (e.g., a "PWD" section). Subsequent attempts to write new data to the communications device 415 may be blocked by the communications device 415 unless the correct password is provided. In some embodiments, the password may be generated by the hosting application. In other embodiments, the password may be established during manufacturing of the communications device 415. In some embodiments, the password may be the same for all accounts on the hosting service, allowing any user with the hosting application installed to access the communications device 415. In other embodiments, the password may be unique to the user account on the hosting application. In some embodiments, the password may be stored securely in the hosting application (e.g., the password may be encrypted). In other embodiments, the password may be stored on a secure element of the mobile device 405.

As shown in FIG. 4, step 414, the communications device 415 can lock with the password and enter a locked state. When the communications device 415 locks, an authentication section of the memory of the communications device 415 (e.g., an "auth0" section) can be modified to indicate the portions of the memory that are locked. In some embodiments, "auth0" may be set to 0 to indicate that the entire memory of the communications device 415 is locked. The lock command can prevent the communications device 415 from storing additional data without first receiving an unlock command.

In embodiments, password protecting the communications device can protect the user data without limiting the functionality of the communications device. Without the password, a malicious actor could, for example, write new data to a user's communications device under the guise of reading data from it. The owner of the communications device may not be aware that their data had been overwritten until other user's read it. The password also can allow the user of the mobile device 405 to change the interaction data stored on the communications device.

Figure 5:
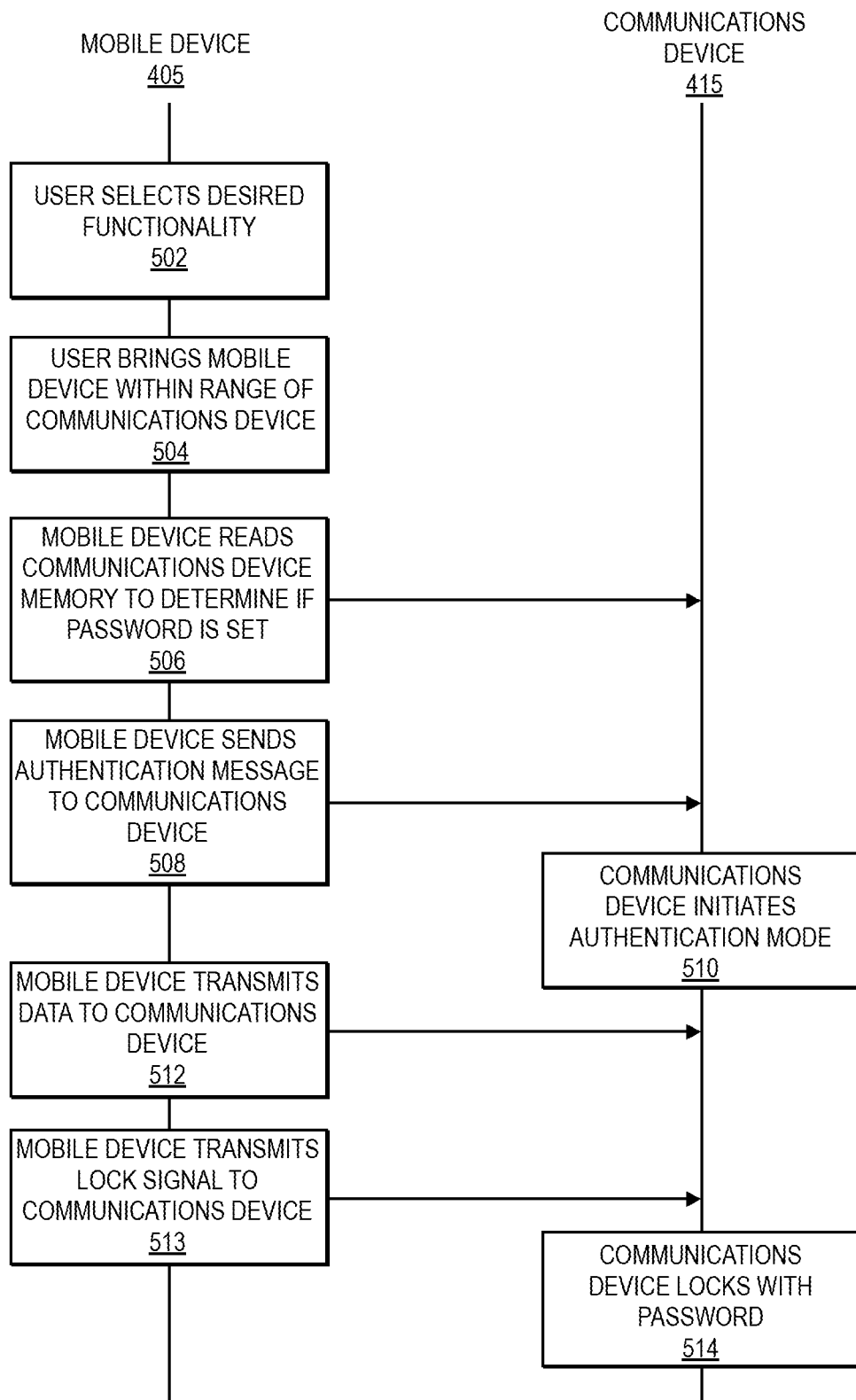
FIG. 5 shows a swim lane diagram of reprogramming an NFC tag according to embodiments of the disclosure.

FIG. 5 illustrates a process of changing the interaction data stored on a communications device that is password protected, such as communications device 115 in FIG. 1.

As shown in FIG. 5, step 502, the user can select a new desired functionality of the communications device 415. The user can make the selection on the hosting application on the mobile device 405. For example, the user may want to change the profile associated with the link stored on the communications device 415. After the user selects the new desired functionality, the hosting application may generate a link to a website associated with the hosting application that encodes the desired functionality.

As shown in FIG. 5, step 504, the user can place the mobile device 405 proximate to the communications device 415 such that the communications device 415 is within the transmission range of an antenna on the mobile device 405.

During the programming process, the communications device may be separated from a mobile device of the user so that the communications device can be placed proximate to the NFC antenna. For example, the communications device may not yet be attached to the mobile device or may be attached to an accessory that is not attached to the mobile device. In some embodiments, the communications device may be within range of the NFC antenna of the mobile device while still being attached to the mobile device. For example, a shielding element on the mobile device may be removed so that the communications device is within the transmission range of the NFC antenna.

As shown in FIG. 5, step 506, the mobile device 405 can read the communications device memory to determine if a password has been set on the communications device 415. For example, the mobile device 405 may read a password section of the memory (e.g., a "PWD" section) to determine if a password is saved there. Additionally, or alternatively, the mobile device 405 may read an authentication section of the memory (e.g., an "auth0" section) to determine if the communications device 415 has been locked. In reading the authentication section, the mobile device 405 may receive an indication that data has been written to the authentication section without accessing the password itself.

As shown in FIG. 5, step 508, the mobile device 405 can send an authentication signal to the communications device 415, the authentication signal comprising the password. In some embodiments, the authentication signal may be a "PWD_AUTH" command. The authentication signal may be an example of an unlock command. The mobile device 405 may retrieve the password from, for example, the hosting application or a secure element of the mobile device 405. In some embodiments, the password may be encrypted and the mobile device 405 may decrypt the password before sending the authentication message. The password may be included in the authentication message as plaintext (e.g., not encrypted) and may be stored as bytes.

As shown in FIG. 5, step 510, the communications device 415 can initiate authentication mode if the password received in the authentication signal matches the password that was used to lock the communications device 415. In some embodiments, a "PWD_AUTH" command may take the stored password as an input parameter. Initiating authentication mode may comprise flipping a bit or otherwise enabling the memory of the communications device to be modified. In some embodiments, the communications device 415 may transmit an authentication response to the mobile device 405 indicating that the communications device 415 is unlocked. For example, an authentication response may be an authentication acknowledge message "PACK."

As shown in FIG. 5, step 512, the mobile device 405 can transmit the new interaction data to the communications device 415. The new interaction data can then be stored in the memory of the communications device 415.

As shown in FIG. 5, step 513, the mobile device 405 may transmit a message to the communications device 415 to trigger locking the communications device 415. The locking message may include the password.

As shown in FIG. 5, step 514, the communications device can lock again with the password after receiving the new data from the mobile device 405. When the communications device 415 locks, the authentication section of the memory of the communications device 415 (e.g., the "auth0" section) can be modified to indicate the portions of the memory that are locked. In some embodiments, "auth0" may be set to 0 to indicate that the entire memory of the communications device 415 is locked. In some embodiments, after storing the new data, the communications device 415 can automatically relock without receiving a locking message as in step 513.

FIG. 6 and FIG. 7 illustrate exemplary screenshots of processes of using an NFC tag to transmit information about social media profiles.

Figure 6C:
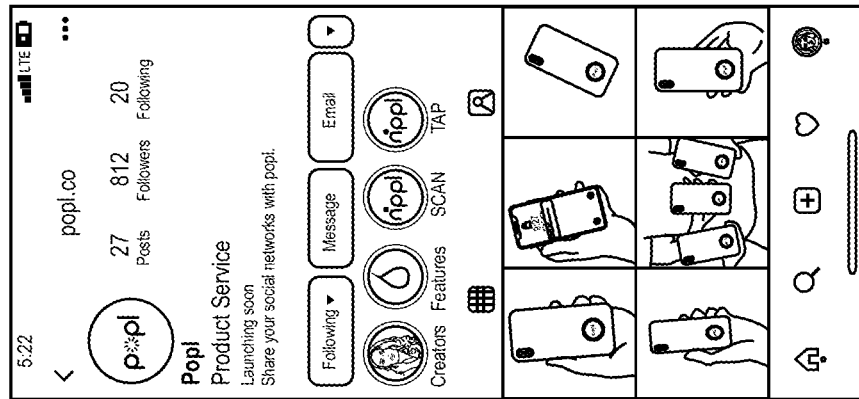
FIGS. 6A-6C show exemplary screenshots of reading interaction data from an NFC tag according to embodiments of the disclosure.
Figure 6B:
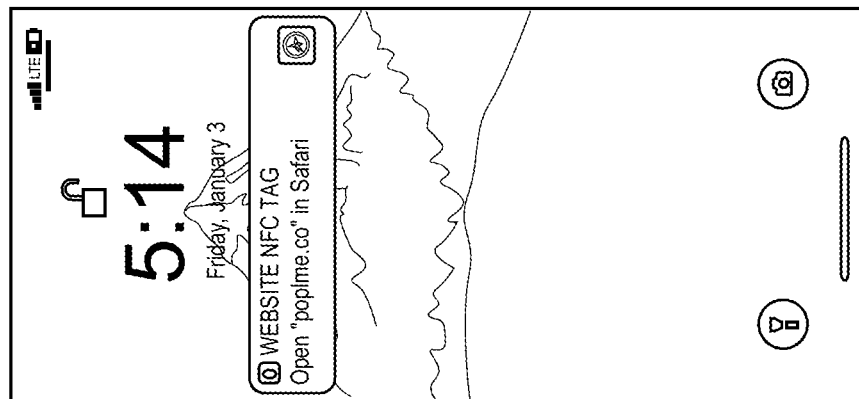
Figure 6A:
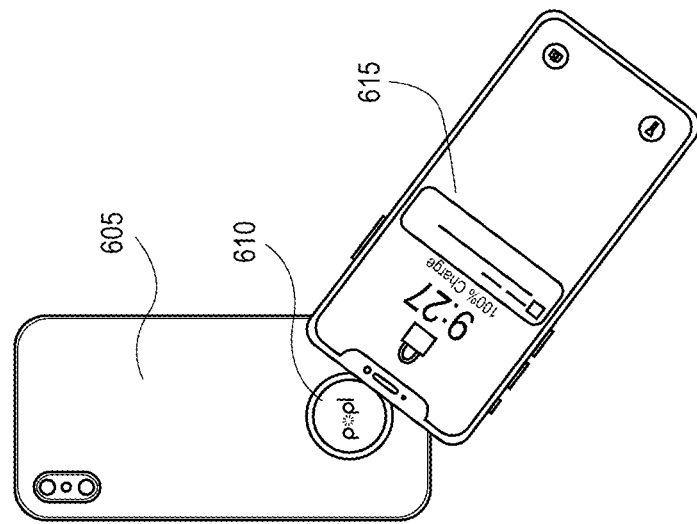

As shown in FIG. 6A, an accessory 610 may be attached to the back of a first electronic device 605. In this embodiment, the first electronic device 605 may be a smartphone, and the accessory 610 may include a communications device and have an adhesive backing that is adhered to the back of the first electronic device. A second electronic device 615 (e.g., a smartphone) may be placed proximate to the communications device such that an antenna on the second electronic device can receive a signal from the communications device. The communications device can transmit interaction data comprising a link to an account of a user of the first electronic device on a hosting service application or website (e.g., Popl®).

As shown in FIG. 6B, after the second electronic device receives the interaction data, the second electronic device can process the interaction data. The second electronic device may get a notification to open a link to the hosting service (e.g., "poplme.co") in a browser such as Safari. The link "poplme.co" may be an abbreviation for the profile of the first user on the hosting application. In some embodiments, the link may be a deep link and the second electronic device may open the link in the browser because the second application does not have the hosting application installed. In other embodiments, the second electronic device may identify the link as a deep link and open the link in an application when the second electronic device determines that the hosting application is installed.

As shown in FIG. 6C, the second electronic device can redirect to a social media account of the first user on a social media service. The link from the communications device may be any type of a link. Thus when the second electronic device begins to open the hosting application or browser window, the hosting application can redirect the second electronic device to the social media application. In this example, the social media service may be Instagram. The profile on the hosting application can include a deep link to the social media application. As the second electronic device opens the hosting application, the hosting application may use PHP code to query a database of the hosting service and determine if direct links are enabled. The PHP code may then retrieve the link identified by the first user. In some embodiments, the link to be used may always be in the same position (e.g., the first link in a list of social media links of the first user). A Javascript command may then replace the link to the hosting application with the link to the desired social media service, redirecting the second electronic device. In some embodiments, a Smarty templating engine may provide an interface between the Javascript code and the PHP code of the hosting website. In one embodiment the Javascript function window.location.replace("https://www.instagram.com/{$oProfile->getInstagram( )}") and/or window.open("https://www.instagram.com/{$oProfile->getInstagram( )}", 'self', null, false) can be used. In some embodiments, the replaced link can be a mobile deep link. The mobile deep link can cause the second electronic device to open the social media profile of the first user on the social media application installed on the second electronic device.

FIG. 7 shows a similar process to that of FIG. 6. However, the second electronic device may process the interaction data from the communications device differently.

Figure 7C:
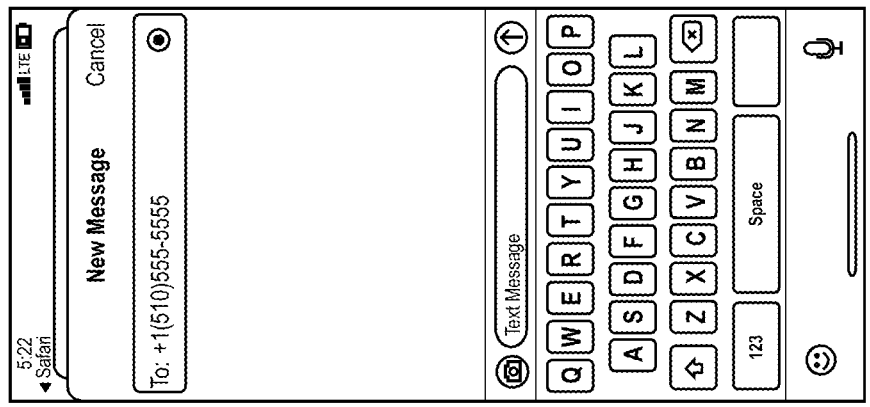
FIGS. 7A-7C show exemplary screenshots of another process of reading interaction data from an NFC tag according to embodiments of the disclosure.
Figure 7B:
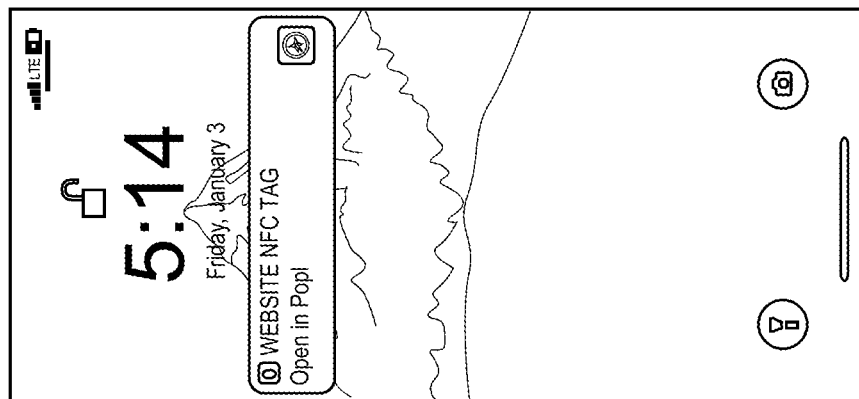
Figure 7A:
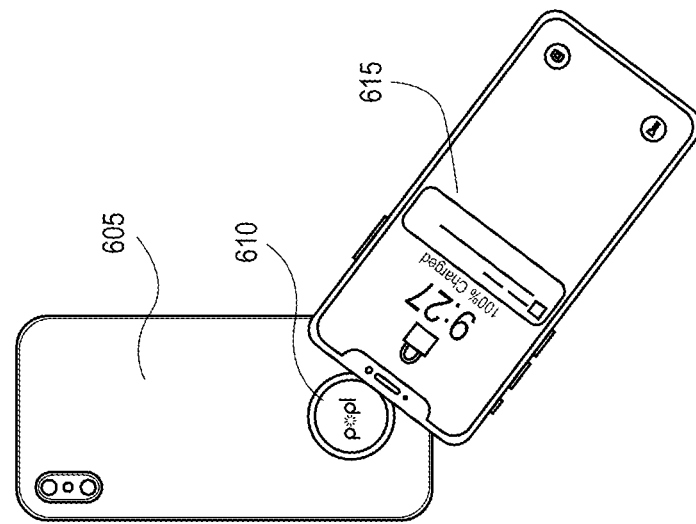

As shown in FIG. 7A, the communications device 610 can be attached to the first electronic device 605 (e.g., a smartphone). The second electronic device 615 (e.g., a smartphone) can then be held proximate to the communications device on the first electronic device such that the communications device can be read by an antenna on the second electronic device. The communications device can then transmit interaction data comprising a link As shown in FIG. 7B, the second electronic device can process the link. The second electronic device can first attempt to open the link to the hosting service (e.g., "pop-lme.co") from the communications device in a hosting service application (e.g., a Popl application). The second electronic device may display a notification that the communications device has caused the second electronic device to begin opening the link. This may allow a user of the second electronic device to prevent the link from opening if, for example, the interaction was accidental or the link is suspected of being malicious.

As shown in FIG. 7C, when the link is accessed, the second electronic device may open a new SMS message to a phone number associated with the first electronic device. The link from the communications device may be a direct link. In this embodiment, the link may first lead to a profile of the first user on a hosting application. The profile of the first user may redirect the browser of the second electronic device to an "sms" link with the phone number of the first electronic device. When the second electronic device opens the "sms" link, it can cause the second electronic device to launch a messaging application (e.g., iMessage) and open a new SMS message to the linked phone number. Other embodiments may redirect the second electronic device to a "mailto" link with an email address of the first user or a "tel" link with the phone number to initiate a phone call to the first electronic device.

Figure 8:
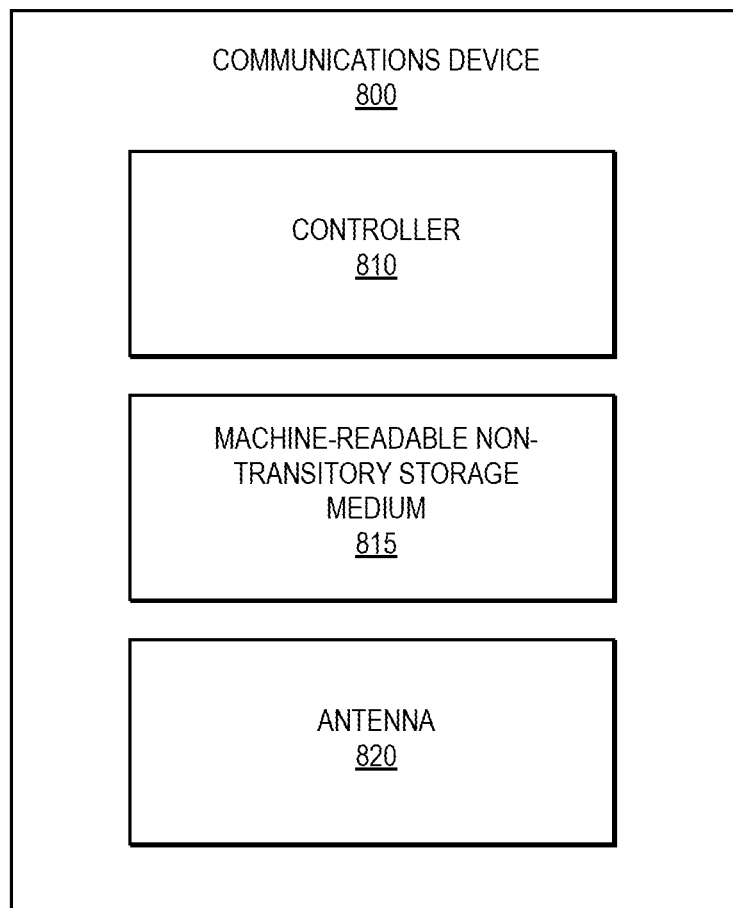
FIG. 8 shows a block diagram of an NFC tag according to embodiments of the disclosure.

FIG. 8 illustrates a block diagram of a communications device 800 according to embodiments. The communications device 800 may comprise a controller 810 operatively coupled to a machine-readable non-transitory storage medium 815 and an antenna 820.

The controller 810 may be implemented as one or more integrated circuits. The controller 810 may be used to control the operation of the NFC tag 800. The controller 810 can execute a variety of programs in response to program code or computer-readable code stored in machine-readable non-transitory storage medium 815.

Machine-readable non-transitory storage medium 815 may comprise one or more non-transitory media for storage and/or transmission. Suitable media include, as examples, a random access memory (RAM), a read only memory (ROM), a magnetic medium, flash memory, and the like. The machine-readable non-transitory storage medium 815 may be any combination of such storage or transmission devices.

The antenna 820 may comprise a wire coil and may be a metallic loop that serves as an inductor. The antenna 820 can receive an electromagnetic signal (e.g., from a mobile device) and generate electricity to power the controller 810.

A non-transitory computer-program product tangibly embodied in the machine-readable non-transitory storage medium 815 may include instructions configured to cause controller 810 to receive interaction data from a first electronic device and store the interaction data. The instructions may also cause controller 810 to receive a signal from a second electronic device proximate to the communications device 800 and transmit the interaction data to the second electronic device causing the second electronic device to access data associated with a unique user account on a website.

Figure 9:
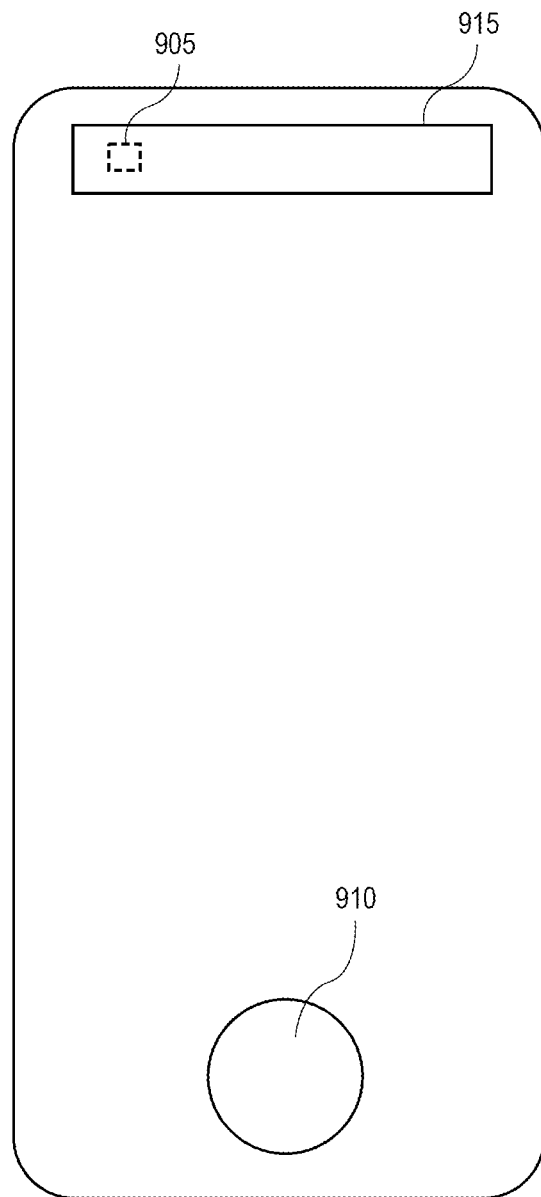
FIG. 9-14 show schematic diagrams of NFC tags according to embodiments of the disclosure.

FIG. 9 illustrates an embodiment of an accessory 910 attached to a rear panel of an electronic device housing. In some embodiments the electronic device can be equipped with an NFC antenna 905 positioned at a particular location. In this particular example, the NFC antenna 905 is positioned proximate a top of the electronic device, however in other embodiments it can be positioned at any other location within the electronic device. In this example accessory 910 can be positioned proximate a bottom of the electronic device such that communications device within the accessory is outside the transmission range of the NFC antenna 905 and the NFC antenna does not read the communications device within the accessory. However the communications device can be read by a second mobile device that is positioned proximate the bottom of the first electronic device. In other examples, NFC antenna 905 may be positioned proximate the bottom of the electronic device, and accessory 910 may be positioned proximate a top of the electronic device such that the communications device within the accessory is outside the transmission range of the NFC antenna. One of skill in the art with the benefit of this disclosure would appreciate other positions of the NFC antenna 905 and the accessory 910.

In another embodiment a second accessory 915 that includes a shield can be positioned at the top of the electronic device. The shield can be positioned between the NFC antenna 905 and the second accessory 915 such that the electronic device does not read the communications device within the second accessory. However, a second electronic device can read the second accessory when positioned proximate the top of the first electronic device. In this way multiple accessories can be attached to an electronic device, some of which can be proximate the NFC antenna 905 for the electronic device. As described in more detail above, in some embodiments each accessory can be configured with unique data that can direct a second electronic device to unique links associated with each respective accessory. In one example, the first accessory can direct a user to a unique link associated with social media accounts (e.g., Instagram®, TikTok®) and a second accessory can direct a user to a link associated with work-associated accounts (e.g., LinkedIn®, a personal website).

Figure 10:
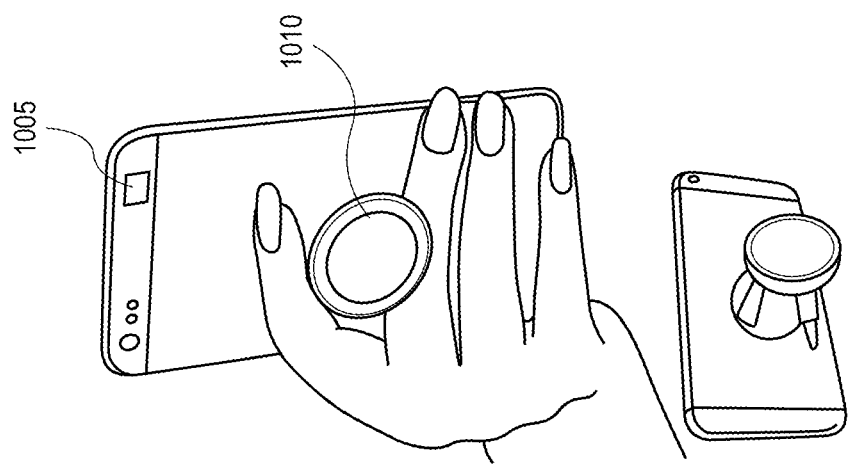

FIG. 10 illustrates a plan view of a rear panel of an electronic device housing. In some embodiments the electronic device can be equipped with an NFC antenna 1005 positioned at a particular location. In this particular example, the NFC antenna is positioned proximate a top of the electronic device, however in other embodiments it can be positioned at any other location within the electronic device. In this example an accessory 1010 can be positioned on a back surface of the electronic device such that the NFC antenna 1005 does not read the accessory. The accessory may be mounted on a post that extends outward from the rear panel. In this example, the accessory may function as a handle or grip sometimes, colloquially known as a socket. In some embodiments, the post may be segmented so that it can lie flat against the rear panel when not in use.

In some embodiments, the accessory 1010 may be attached directly to the rear panel of the electronic device housing. For example, the accessory may have an adhesive backing. The adhesive backing may adhere the accessory to the rear panel, or to a case surrounding the electronic device housing. In other embodiments, the accessory 1010 may be part of a removable case that can be attached to the electronic device housing.

Figure 11:
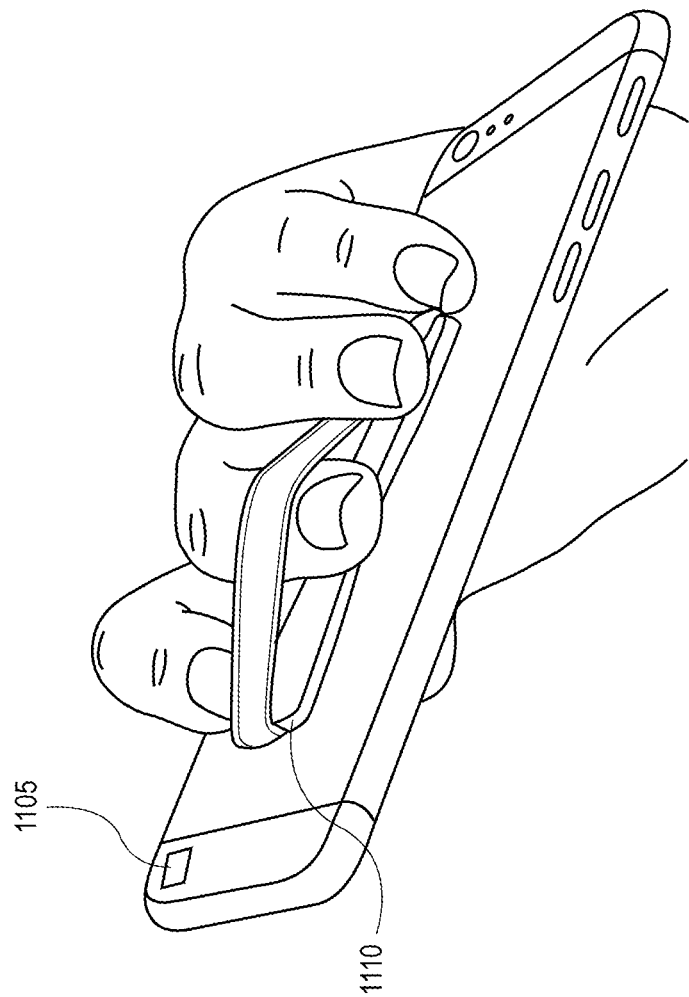

FIG. 11 illustrates an isometric view of an electronic device housing. In some embodiments the electronic device can be equipped with an NFC antenna 1105 positioned at a particular location. In this particular example, the NFC antenna is positioned proximate a top of the electronic device, however in other embodiments it can be positioned at any other location within the electronic device. In this example a first accessory 1110 can be positioned proximate a center of the electronic device such that the NFC antenna 1105 does not read the accessory. The accessory may be contained within a flexible strip that extends outward from the rear panel. In this example, the accessory may function as a handle or grip. One of skill in the art with the benefit of this disclosure will appreciate the many different forms and functions of accessories that can be attached to mobile device and include a communications device as described herein.

Figure 12:
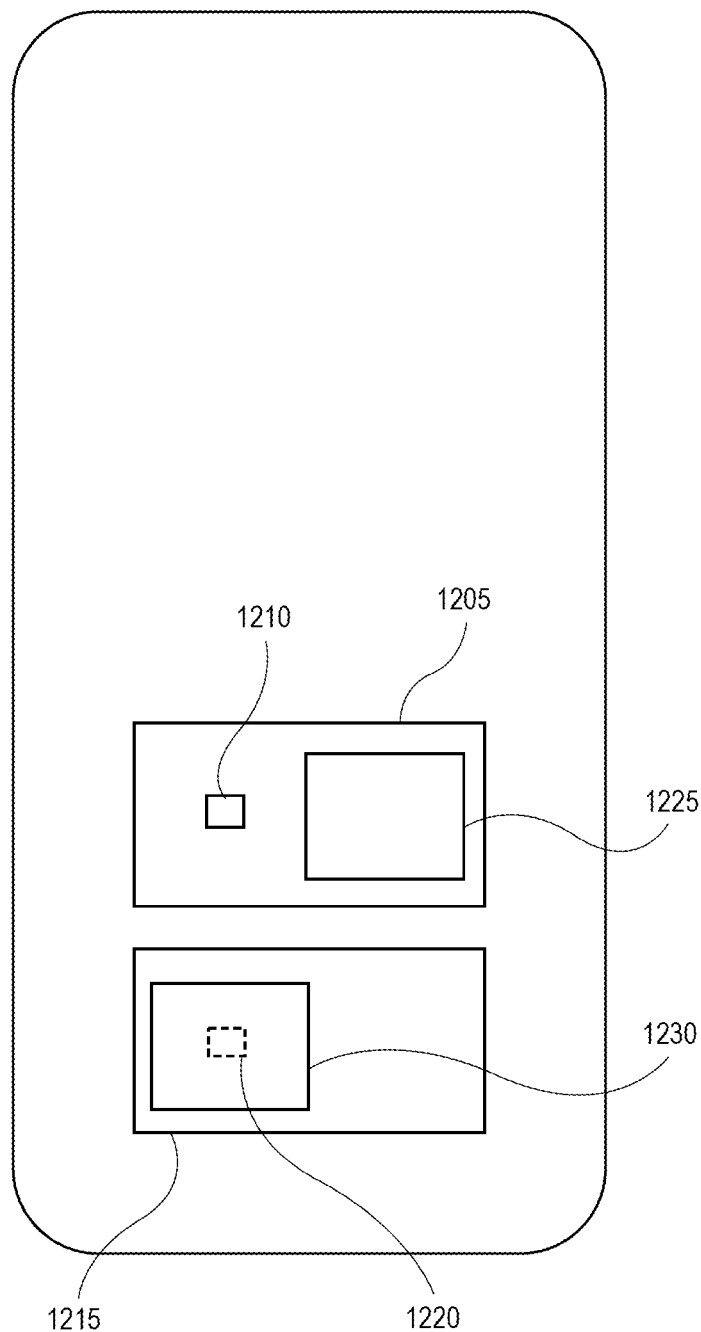

FIG. 12 illustrates a plan view of a rear panel of an electronic device housing. In some embodiments the electronic device can be equipped with a first accessory 1205 that includes a first communications device 1210 and a second accessory 1215 that includes a second communications device 1220. First and second accessories 1205, 1215 can each have a respective configurable shield, 1225, 1230, respectively that can be positioned to allow communications device to be read (e.g., see shield 1225) or positioned to block communications device from being read (see e.g., shield 1230). That is, shield 1230 has been positioned by the user over the second NFC tag 1220 to protect the user's information from being read by a second mobile device. If the user desires the information from the second NFC tag to be read, the user can position shield 1230 to the side, allowing the NFC tag to be read. In some embodiments the shield is made from a ferrous material, including but not limited to iron, steel or ferrite.

Figure 13:
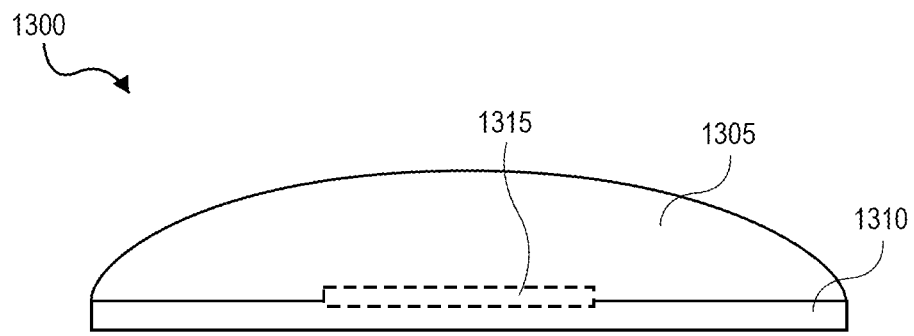

FIG. 13 illustrates an accessory 1300 that includes an overlay 1305 attached to a substrate 1310 that encloses a communications device 1315. In some embodiments the overlay can be made from a soft material that can provide protection for and/or an aesthetic feel for the electronic device. In other embodiments it can be a hard material that can provide a particular feel and/or look to the electronic device. In some embodiments the overlay can be removable, as shown in FIG. 14.

In another embodiment a retainer mechanism can be semi-permanently attached to the electronic device and NFC tags can be interchangeably received within the retainer such that a user can switch out tags depending on what aesthetics they want and/or what information they would like to share with others. For example, at a social gathering a user may use an NFC tag with their favorite sports team logo that links to their social media profile, however when at a business gathering a user may use an NFC tag with their business logo and a link to their business website and/or contact information.

Figure 14:
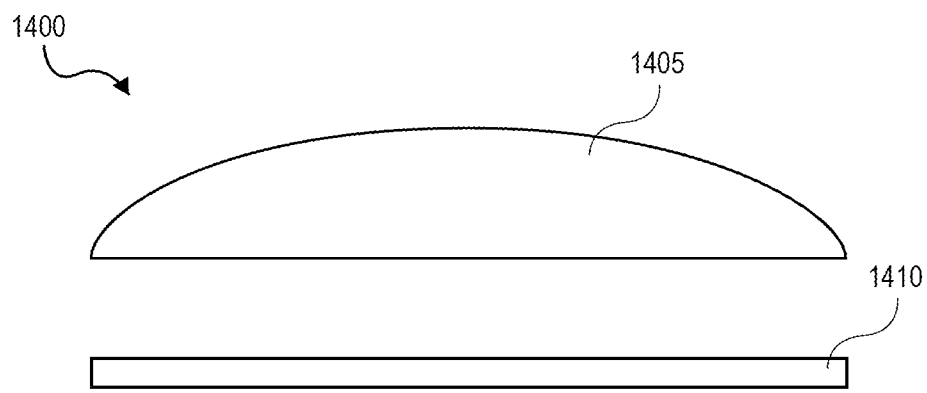
Figure 14:
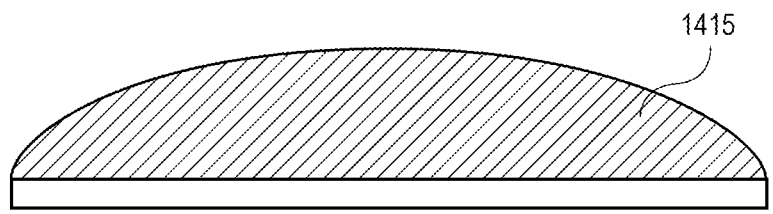

FIG. 14 illustrates an accessory 1400 that includes an overlay 1405 that is detachable from a substrate 1410 that contains the NFC device. In some embodiments the first overlay 1405 can be removed from the substrate 1410 and replaced with a second overlay 1415 having a different color, texture and/or design than the first overlay. In this way, while the substrate and communications device remain attached to a user's electronic device, the user can change the overlay which changes the appearance and/or feel of the accessory.

In other embodiments the overlay can include the communications device and thus when the overlay is changed the communications device is changed.

One of ordinary skill would recognize many variations, modifications, and alternatives in view of the aforementioned embodiments. In further embodiments the accessory can be configured to substantially match a color of the electronic device to blend in with it. In some embodiments the substrate of the accessory can include a ferrous or insulative material that enables the communications device to be read when it is adhered to a metallic surface. In other embodiments the communications device can be integrated into a phone case, such as, for example insert molded within, positioned within a pocket formed within by other means. In some embodiments the phone case can include shielding to shield the phone from reading the communications device, but allows a separate electronic device to read the communications device. In further embodiments the case can include a movable shield that can be configured into a first position that protects the communications device from being read by another electronic device and a second position that enables the communications device to be read by another electronic device.

Figure 15C:
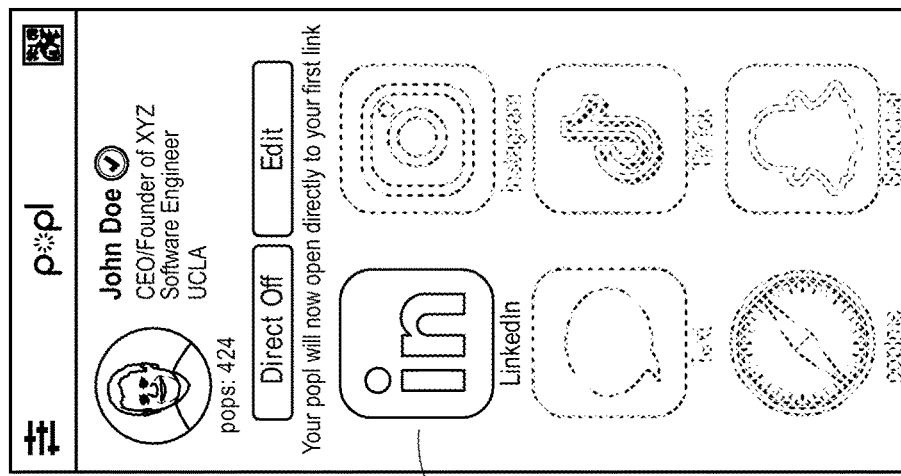
FIGS. 15A-15C show exemplary screenshots of a user interface for selecting a desired social media profile according to embodiments of the disclosure.
Figure 15B:
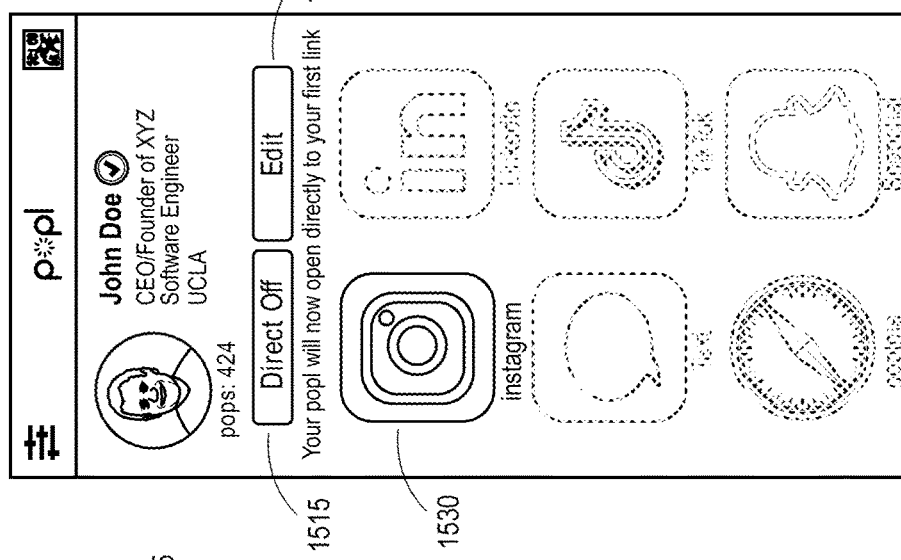
Figure 15A:
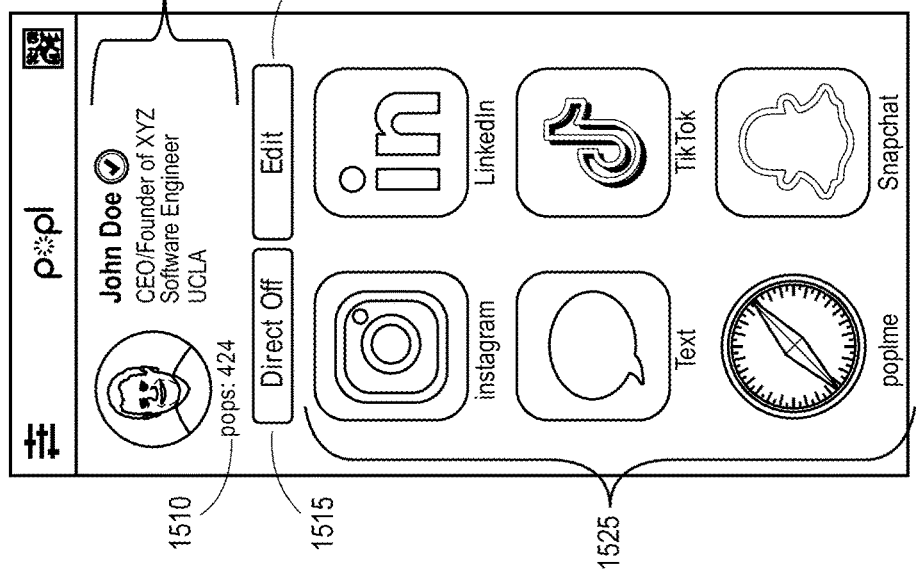

FIG. 15A-C illustrate example screenshots of a hosting application (e.g., Popl®) in accordance with the embodiments described herein. FIG. 15A illustrates an exemplary screenshot of a user's profile on the hosting application. The profile may include, in block 1505, basic information about the user, such as a photograph, their name, and a short description. Users may be able to update the description to include additional information such as contact information, or professional or personal affiliations. There may also be a counter 1510 displaying the number of times the user has shared their profile using the NFC tag. In some embodiments, some users may be designated as "verified", indicated by a blue checkmark next to their name. This may indicate that the hosting application has authenticated the identity of the user. The profile may also display links to other social media accounts of the user with icons of the social media services, as shown in block 1525. For example, the user may have accounts on Instagram®, LinkedIn®, TikTok®, and Snapchat®. The profile may also include links to other means of connecting with the user. For example, the profile may include an icon for text messages that directs to an "sms" link for composing an SMS message to the user. The profile may also include links that are not associated with a particular social media service. For example, a user may wish to provide links to a personal website, a website of their employer, a nonprofit that they are affiliated with, or a social media service that is not supported by the hosting application.

In some embodiments, when a user views their own profile, the profile may display options for configuring the profile. For example, block 1515 may present an option to toggle "direct" links and block 1520 may present an option to edit the profile. In this example, block 1515 indicates that "direct" links are turned off. Thus, when someone accesses the profile via an NFC tag, they will access the profile without being redirected to a linked social media account. In some embodiments, editing the profile may include changing the user's name, description, adding or removing linked social media accounts, and rearranging the order of existing linked social media accounts (e.g., by dragging and dropping). In this example, selecting block 1520 can initiate editing of the profile.

FIG. 15B illustrates an exemplary screenshot of the user's profile on the hosting application where direct links have been enabled. In this example, block 1515 may now be highlighted green and state that direct links are on. When direct links are enabled, the profile may automatically redirect viewers to one of the linked social media accounts. In some embodiments, the profile may redirect to the social media service in the top left position, as shown in block 1530, of the profile and the other social media service icons may be shaded gray. In this example, the user may have selected Instagram® to be a direct link. In other embodiments, the selected social media service may be displayed in another position on the screen.

FIG. 15C illustrates an exemplary screenshot of the user's profile with a different social media service selected for the direct link. In this example, LinkedIn® may be selected for the direct link, so the LinkedIn® icon may be displayed in the top left position, and shown in block 1535, and the other icons may be shaded gray. Thus, the hosting application can redirect viewers to the LinkedIn® profile (e.g., from within the LinkedIn® application if it is installed, or from the LinkedIn® website if it is not installed) of the user instead of the Instagram® profile of the user. In some embodiments, a user may be able to change the link for the direct link by rearranging the icons in the profile. For example, in some embodiments, the user can drag and drop the icons to rearrange them. The icon that is placed in the top left position may be used as the direct link. In other embodiments, the user may be able to select a social media service or other link to serve as the direct link when editing the profile. The corresponding icon then may or may not be displayed in the top left position.

Figure 16:
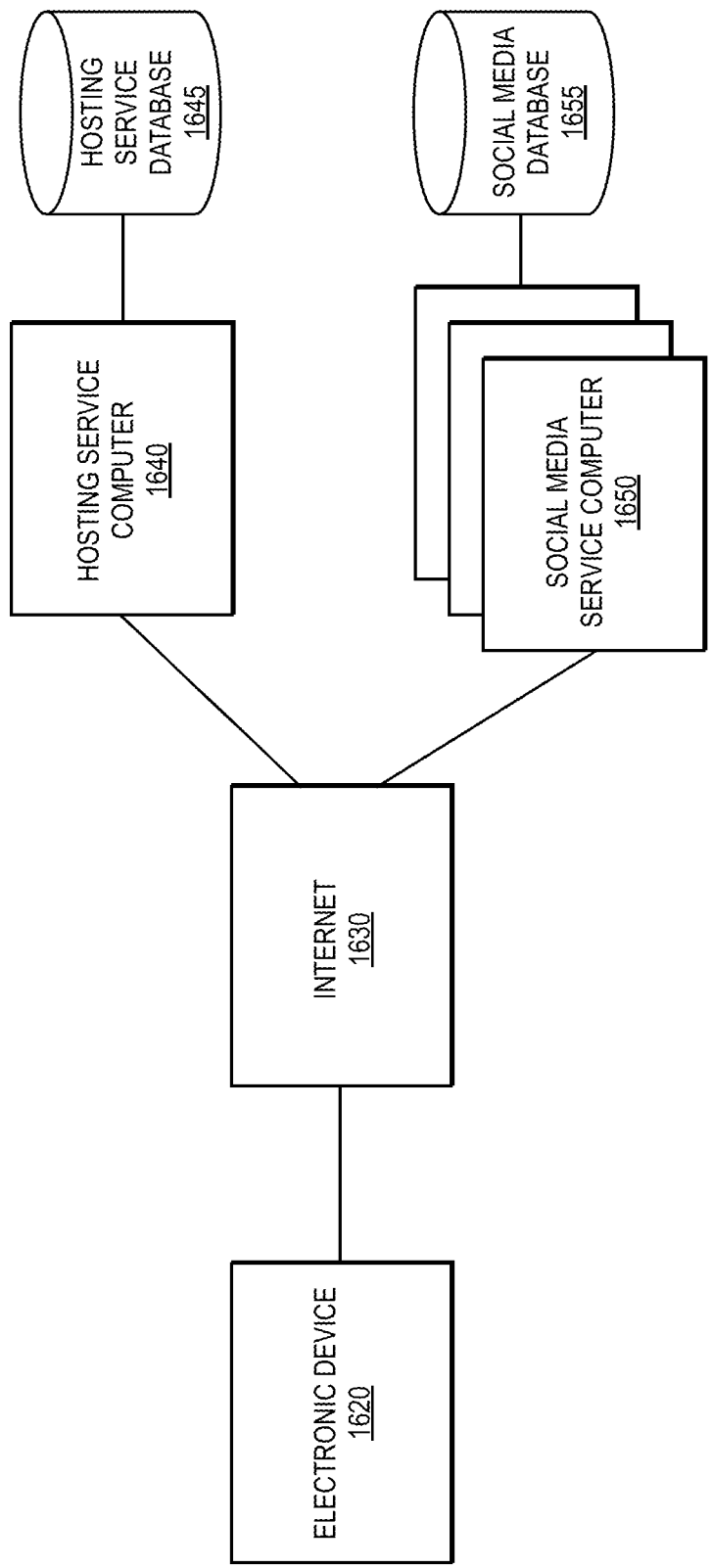
FIG. 16 shows a block diagram of a communications system according to embodiments of the disclosure.

FIG. 16 illustrates a high level communication diagram in accordance with the embodiments described herein. There is an electronic device 1620 (e.g., the second electronic device of FIG. 1). The system may also include a hosting service computer 1640 and a plurality of social media service computers 1650 (e.g., The hosting service computer 1640 may manage data for a hosting service (e.g., PopI®). The data may be stored in a hosting service database 1645. Data stored in the hosting service database may include user profiles, links to social media profiles, API tokens, and access tokens. Electronic device 1620, hosting service computer 1640, and social media service computers 1650 may be in operative communication via any suitable number of types of communications networks or communication channels via internet connection 1630.

An exemplary communication network may include any suitable communication medium. The communication network may be one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Message between the entities, providers, networks, and devices illustrated in FIG. 1 may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like. The parties may communicate with each other and the ledgers via secure and authenticated communication channels.

Although the electronic device is described and illustrated as one particular electronic device, embodiments of the disclosure are suitable for use with a multiplicity of electronic devices. For example, any device that receives or transmits audio, video or data signals can be used with embodiments of the disclosure. In some instances, embodiments of the disclosure are particularly well suited for use with portable electronic media devices because of their transportability. As used herein, an electronic media device includes any device with at least one electronic component that can be used to present human-perceivable media. Such devices can include, for example, portable music players (e.g., MP3 devices and Apple's iPod devices), portable video players (e.g., portable DVD players), cellular telephones (e.g., smart telephones such as Apple's iPhone devices or Android OS devices), video cameras, digital still cameras, projection systems (e.g., holographic projection systems), gaming systems, PDAs, as well as tablet (e.g., Apple's iPad devices), laptop or other mobile computers. Some of these devices can be configured to provide audio, video or other data or sensory output.

For simplicity, various internal components, such as the control circuitry, graphics circuitry, bus, memory, storage device and other components of electronic device 100 (see FIG. 1) are not shown in the figures.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. An accessory comprising:
   a body arranged to be removably attached to a first mobile electronic device; and
   a near-field communications (NFC) tag integrated in the body and arranged to transmit interaction data in response to receiving a signal from a second mobile electronic device, wherein the interaction data causes the second mobile electronic device to access a hosting site, and wherein in response to being accessed the hosting site transmits instructions to the second mobile electronic device to access contact information associated with a user of the first mobile electronic device.

2. The accessory of claim 1, wherein the body comprises a flexible strip.

3. The accessory of claim 2, wherein the flexible strip is arranged to secure the first mobile electronic device to a user.

4. The accessory of claim 2, wherein the flexible strip is arranged to be formed around at least a portion of a user's body.

5. The accessory of claim 2, wherein the flexible strip forms at least a portion of a closed loop.

6. The accessory of claim 2, wherein the flexible strip is arranged to secure the first mobile electronic device to a limb of a user.

7. The accessory of claim 1, wherein the contact information includes a profile of the user of the first mobile electronic device.

8. An accessory for a mobile electronic device, the accessory comprising:
 a structure arranged to be attached to the mobile electronic device; and
 a near-field communications (NFC) tag integrated in the structure and arranged to transmit interaction data in response to receiving a signal from an electronic device, wherein the interaction data causes the electronic device to access a website, and wherein in response to being accessed the website transmits instructions to the electronic device to access a web location that contains personal contact information.

9. The accessory of claim 8, wherein the structure comprises a flexible strip.

10. The accessory of claim 9, wherein the flexible strip is arranged to secure the mobile electronic device to a user.

11. The accessory of claim 9, wherein the flexible strip is arranged to be formed around at least a portion of a user's body.

12. The accessory of claim 8, wherein the structure is arranged to be removably attached to the mobile electronic device.

13. The accessory of claim 9, wherein the flexible strip forms at least a portion of a closed loop.

14. The accessory of claim 9, wherein the flexible strip is arranged to secure the mobile electronic device to a limb of a user.

15. The accessory of claim 8, wherein the personal contact information includes a profile of a user of the mobile electronic device.

16. A device comprising:
 an accessory for a first electronic device and a near-field communications (NFC) tag integrated in the accessory, the NFC tag arranged to transmit interaction data in response to receiving a signal from a second electronic device, wherein the interaction data causes the second electronic device to access a website, and wherein in response to being accessed the website transmits instructions to the second electronic device to access a web location that includes contact information.

17. The device of claim 16, wherein the accessory comprises a flexible strip.

18. The device of claim 17, wherein the flexible strip is arranged to secure the first electronic device to a user.

19. The device of claim 17, wherein the flexible strip is arranged to be formed around at least a portion of a user's body.

20. The device of claim 16, wherein the accessory is arranged to be removably attached to the first electronic device.

* * * * *